United States Patent [19]

Koyama

[11] Patent Number: 5,546,533
[45] Date of Patent: Aug. 13, 1996

[54] DYNAMIC DEVICE RECONFIGURATION HAVING RESTRICTED MAIN STORAGE ACCESS FOR SUBSYSTEM EMPLOYING MAGNETIC UNITS

[75] Inventor: Susumu Koyama, Kawasaki, Japan

[73] Assignee: Fujitsu Limited, Japan

[21] Appl. No.: 543,771

[22] Filed: Oct. 16, 1995

Related U.S. Application Data

[63] Continuation of Ser. No. 162,214, Dec. 2, 1993, abandoned.

[30] Foreign Application Priority Data

Dec. 10, 1992 [JP] Japan .................. 4-330274

[51] Int. Cl.⁶ .......................... G06F 11/00; G06F 11/30
[52] U.S. Cl. .......................................... 395/182.03
[58] Field of Search .................. 395/182.03, 182.05, 395/182.06, 182.16, 184.01; 371/48

[56] References Cited

U.S. PATENT DOCUMENTS

| | | | |
|---|---|---|---|
| 4,562,578 | 12/1985 | Odaka et al. | 371/40.1 |
| 4,611,314 | 9/1986 | Ogata et al. | 369/32 |
| 5,155,835 | 10/1992 | Belsan | 395/425 |
| 5,247,638 | 9/1993 | O'Baenet et al. | 395/425 |

FOREIGN PATENT DOCUMENTS 4-360227  12/1992  Japan .

*Primary Examiner*—Hoa T. Nguyen
*Attorney, Agent, or Firm*—Greer, Burns & Crain, Ltd.

[57] ABSTRACT

A host computer executes dynamic device reconfiguration to cope with a device error generated while data is being written in a magnetic tape unit. The function of the dynamic device reconfiguration is implemented by a save function, a tape shift instructing function and a rewrite function which are provided by an operating system of the host computer. When the expanded data transferred from the input and output control unit when the error is generated is written in a save area in the main storage area, it is compressed. When the compressed data read from the save area in the main storage for rewriting is transferred to the magnetic tape unit to which a tape has been shifted, it is expanded. In the main storage area, the save area having a size corresponding to that of the compressed data which remains in a buffer memory is reserved.

24 Claims, 26 Drawing Sheets

FIG. 17

| COMMAND | ABBREVIATED NAME | CONTENTS |
|---|---|---|
| READ COMMAND WITH EXPANSION INHIBITING FUNCTION APPENDED | XP-RBF | THE DATA IN THE BUFFER IS READ TO THE MAIN STORAGE WITHOUT EXPANSION |
| WRITE COMMAND WITH COMPRESSION INHIBITING FUNCTION APPENDED | XP-WR | THE DATA IN THE MAIN STORAGE IS TRANSFERRED TO AND WRITTEN IN THE BUFFER WITHOUT COMPRESSION |

FIG. 28

| COMMAND | ABBREVI-ATED NAME | CONTENTS |
|---|---|---|
| DESTINATION DESIGNATING COMMAND | SWAP | DESTINATION MAGNETIC TAPE UNIT IS DESIGNATED. THIS COMMAND IS FOLLOWED BY 1-BYTE DESTINATION ADDRESS |
| REWRITE COMMAND | DWR | THE DATA SHIFTED TO THE BUFFER OF THE DESTINATION MAGNETIC TAPE CONTROL UNIT IS REWRITTEN IN THE MAGNETIC TAPE MOUNTED ON THE DESTINATION TAPE UNIT |

DYNAMIC DEVICE RECONFIGURATION HAVING RESTRICTED MAIN STORAGE ACCESS FOR SUBSYSTEM EMPLOYING MAGNETIC UNITS

RELATED APPLICATION

This is a continuation of application Ser. No. 08,162,214, filed on Dec. 2, 1993, now abandoned.

BACKGROUND OF THE INVENTION

The present invention relates to an apparatus for recovering errors and a method thereof for a subsystem which are intended to recover the device errors of a magnetic tape unit provided as an input/output unit. More particularly, the present invention relates to an apparatus for recovering errors and a method thereof for a subsystem employing a magnetic tape unit in which a host computer executes dynamic device reconfiguration to cope with a device error which occurs while data is being written in the magnetic tape unit.

In a subsystem employing a magnetic tape unit which is used as an external storage of a host computer, a magnetic tape control unit receives the input/output commands issued by the host computer, and performs writing or reading on the magnetic tape units which are subordinate thereto. Transfer of commands and data between the host computer and the magnetic tape control unit is executed asynchronously with transfer of commands and data between the magnetic tape control unit and the magnetic tape unit.

When an error occurs while the magnetic tape control unit is executing writing on the magnetic tape unit based on the writing commands sequentially issued by the host computer, the host computer receives an input/output interrupt of a machine check based on the error generation, and executes the error recovering process known as dynamic device reconfiguration.

In this error recovering process, the host computer saves, in the main storage, the data which has not been written and hence remains in the buffer memory of the magnetic tape control unit, discharges a cassette from the magnetic tape unit which has generated an error, and then designates another normal magnetic tape unit to which the cassette is to be mounted. Once the operator has manually mounted the cassette on the designated normal magnetic tape unit, the host computer rewrites the data which has been saved in the main storage in the mounted magnetic tape.

In recent years, the data transferred to the magnetic tape control unit is compressed and then stored in the buffer memory. When the data is read, it is expanded and then transferred from the buffer memory to the host computer. When such a compression or expansion of data is performed, since there is a limitation to the size of the save area reserved in the main storage for error recovery, it may be impossible to reserve an enormous save area required to transfer the compressed data remaining in the buffer memory after the data is expanded. Alternatively, execution of other jobs may be limited due to the reservation of an enormous save area.

FIG. 1 illustrates a conventional subsystem which incorporates magnetic tape units. Magnetic tape control units 30-1 and 30-2 are connected, via channel buses, to channels 20-1 and 20-2 of a host computer 10, respectively. Magnetic tape units 32-1 through 32-8, indicated by device ID #1 through #8, and magnetic tape units 32-9 through 32-18, indicated by device ID #8 through #16, are respectively connected to a device path extended from the magnetic tape control unit 30-1 and a device path extended from the magnetic tape control unit 30-2.

The host computer 10 has an input/output processing function implemented by an operating system (OS) 34 to issue input/output commands to the magnetic tape control units 301 and 30-2. Assuming that the operating system 34 is sequentially issuing, to the magnetic control unit 30-1, writing commands WR1 through WR4 aimed to the magnetic tape unit 32-1 having device ID #1, the writing commands WR1 through WR4 are stacked in a command queue of the magnetic tape control unit 30-1, and the data (in units of blocks) are stored in a buffer memory 62-1. The operating system 34 ends the input/output commands by issuing a channel end at the end of the transfer. Asynchronously with this host computer's access to the magnetic tape control unit 30-1, the magnetic tape control unit 30-1 fetches the write commands WR1 through WR4 in sequence from the command queue, and executes writing in the magnetic tape unit 32-1 having device ID #1.

As an effective means of recovering an error which occurs during data transfer between the magnetic tape control unit and the magnetic tape unit based on the writing commands or reading commands, a function, called dynamic device reconfiguration, is provided in the operating system 34 of the host computer 10. A machine check input/output interruption is generated when an error that cannot be recovered by the subsystem has occurred in the magnetic tape unit 32-1 while the magnetic tape control unit 30-1 is performing writing on the magnetic tape unit 32-1 based on the successive writing commands WR1 through WR4. That dynamic device reconfiguration is executed when the operating system 34 receives error information through the machine check input/output interruption. In this dynamic device reconfiguration, the data present on the buffer memory 62-1 of the magnetic tape control unit 30-1 and corresponding to, for example, write commands WR2 through WR4 is first read and saved in a main storage 38. After the cartridge has been manually shifted by the operator from the magnetic tape unit 30-1 which has generated an error to a magnetic tape unit subordinate to another magnetic tape control unit 30-2, e.g., the magnetic tape unit 32-9 indicated by device ID #9, the data is rewritten from the main storage 38 to the magnetic tape unit 32-9 to which the cartridge has been shifted. Consequently, all the data corresponding to the writing commands WR1 through WR4 are written in the magnetic tape medium of the shifted cartridge, achieving an error recovery.

Dynamic device reconfiguration executed to recover an error which occurs while data is being read from the magnetic tape unit requires only shift of the cartridge from the magnetic tape unit which has generated an error to another magnetic tape unit and does not require save of the data in the main storage.

In the subsystem employing the magnetic tape units which is available in recent years, the data transferred from the host computer to the magnetic tape control unit for writing is compressed and stored in the buffer memory, and the compressed data is written in the magnetic tape unit in order to increase the storage capacity thereof. Regarding the data which is read out from the magnetic tape unit and stored in the buffer memory of the magnetic tape control unit, it is expanded and then transferred from the buffer memory to the host computer.

In such a subsystem in which compression and expansion of the data are performed in the magnetic tape control unit, the data remaining in the buffer memory is expanded and the expanded data is saved in the main storage in the dynamic device reconfiguration conducted to recover an error which occurs during writing.

Assuming that the compressed data of 512K bytes, compressed at a compression rate of about 2% of the original data, are present in the buffer memory for writing, reading of such compressed data in the buffer memory after expansion requires an enormous main storage area of 256M bytes. If the data present in the buffer memory is not the compressed data, reading of that data from the buffer memory for saving requires the same size of the main storage area, which is 512K bytes.

When an enormous area is reserved in the main storage for dynamic device reconfiguration, other jobs may be interrupted during the error recovery process because they cannot use the main storage, thus reducing the processing capability of the entire system. Further, if an enormous main storage area to be used for reading the data cannot be reserved, the error recovery process is terminated abnormally (abend). In that case, the job which has generated an error must be rerun. Rerunning of the job generally covers several cartridges, and requires an error recovery work which lasts for many hours.

SUMMARY OF THE INVENTION

An object of the present invention is to provide an apparatus for recovering errors and a method thereof for a subsystem which employs magnetic tape units which enable errors to be reliably recovered without restricting the execution of other jobs by restricting the area in a main storage area which is used in a dynamic device reconfiguration when data is compressed and written in the magnetic tape unit.

The present invention is intended for a computer system including a host device, such as a host computer, and a subsystem having input and output units. The host device has a main storage area for executing input/output commands between the host device and the external storage to write data in the external storage or to read data from the external storage. The subsystem has at least two input and output control units. The input and output control unit receives the commands from the host device and execute a process on one of the magnetic tape units each having a tape medium. The data transferred from the host device is compressed, stored in a buffer memory and then written in the magnetic tape unit. The data read from the magnetic tape unit is stored in the buffer memory, expanded and then transferred to the host device. Each of the input and output control units includes an error detection unit for detecting an error generated while the data is being written in the tape medium on the basis of the commands from the host device and for informing generation of the error to the host device.

The host device includes a saving unit, a tape shift instructing unit and a rewriting unit. The save unit reserves a save area in the main storage area and writes the data remaining in the buffer memory in the save area when generation of the error is informed from the error detection unit. The tape shift instruction unit makes the magnetic tape unit which has generated the error discharge the tape medium and designates the normal magnetic tape unit which is subordinate to the other input and output control unit to instruct mounting of the discharged tape medium thereon. The rewriting unit writes the data in the save area in the magnetic tape unit to which the tape medium has been shifted after mounting of the tape medium, based on the instruction of the tape shift instruction unit, has been confirmed. The saving unit, the tape shift instructing unit and the rewrite unit constitute the function of dynamic device reconfiguration.

In a first preferred form of the present invention, the host device includes a compression/expansion unit performs compression when the data transferred from the input and output control unit is written in the save area by the saving unit and performs expansion when the compressed data read from the save area in the main storage is transferred to the magnetic tape unit to which the tape medium has been shifted by the rewriting unit. Thus, the size of the save area reserved by the saving unit in the main storage area can be the same as the size of the compressed data which remains in the buffer memory.

In the first preferred form, the proportion of the area in the main storage used by the save area can be reduced by performing compression by the operating system of the host device when the data in the buffer memory is read to the main storage on the basis of the buffer memory read commands.

In a second preferred form of the present invention, the saving unit reserves a save area in the main storage area and transfers the data remaining in the buffer memory to another subsystem, e.g., to another subsystem which employs magnetic disk units, via the save area to write the data therein when generation of the error is informed from the error detecting unit. Thus, the rewriting unit writes the data stored in the another external storage in the magnetic tape unit to which the tape medium has been shifted via the save area in the main storage after mounting of the tape medium, based on the instruction of the tape shift instructing unit, has been confirmed.

In the second preferred form of the present invention, the operating system of the host device reserves the portion of the main storage area having a fixed size as the work area. The data read on the basis of the buffer memory read commands is temporarily stored in the work area, and then written in the external storage, such as a magnetic disk subsystem, for saving. Thus, storage of all the read data in the main storage can be avoided.

In a third preferred form of the present invention, a saving unit reserves a save area in the main storage area and transfers the compressed data remaining in the buffer memory to the save area without expanding the data to write the data therein when generation of the error is informed from the error detecting unit. Thus, the rewrite unit writes the compressed data stored in the save area in the magnetic tape unit to which the tape medium has been shifted without changing the data after mounting of the tape medium, based on the instruction of the tape shift instructing unit, has been confirmed. In an actual operation, the saving unit makes the input and output control unit transfer the compressed data read from the buffer memory without changing the data by issuing, to the input and output control unit, the read commands which inhibit expansion of the compressed data. The rewrite unit makes the input and output control unit write the compressed data transferred from the save area in the main storage without changing the data in the buffer memory by issuing, to the input and output control unit having the magnetic tape unit to which the tape has been shifted, the write commands which inhibit compression of the transferred data.

In the third preferred form of the present invention, when the hardware of the subsystem receives the buffer memory read commands with the expansion inhibiting function appended thereto from the host device, it transfers the compressed data to the host device without expanding it to the original data. Thus, the size of the save area reserved in the main storage can be the same as the size of the conventional non-compressed data.

In a fourth preferred form of the present invention, the input and output control unit further includes a logical buffer memory unit and a transfer control unit. The logical buffer memory control unit stores original data, which is not compressed and which corresponds to the compressed data stored in the buffer memory, in a virtual logical buffer memory each time the data is transferred from the host device, and removes the original data, which is not compressed and which corresponds to the compressed data written from the existing buffer memory in the magnetic tape unit, from the logical buffer memory each time the compressed data is written from the existing buffer memory. Thus, if the size of the save area that can be reserved in the main storage area for dynamic device reconfiguration is set as the size of the logical buffer memory, only the data having the same size as that of the save area that can be reserved in the main storage area is stored in the buffer memory of the input and output control unit, and failure in the reservation of the save area can thus be avoided, guaranteeing the function of the dynamic device reconfiguration.

In the fourth preferred form of the present invention, when the data from the host device is compressed and written in the real buffer memory by the hardware of the subsystem, the size of the original data corresponding to the written data is cumulatively stored in the virtual logical buffer memory. When the logical buffer memory reaches a predetermined threshold, i.e., when the logical buffer memory becomes full, the subsystem temporarily enters a busy state to interrupt data transfer from the host device. When the data in the real buffer memory is written in the tape medium and the cumulative value of the logical buffer memory thereby reduces to the threshold or less, i.e., when a free area is generated in the logical buffer memory, data transfer from the host device is accepted again. Thus, the size of the original data corresponding to the data stored in the buffer memory when an error has occurred can be maintained to a fixed value or less.

In a fifth preferred form of the present invention, when the generation of an error is informed from the error detecting unit, the saving unit transfers the data remaining in the buffer memory directly to the buffer memory of another input and output control unit for saving. In that case, rewrite unit writes the data in the buffer memory to the magnetic tape unit to which the tape has been shifted after it has confirmed mounting of the tape medium based on the instruction of the tape shift instructing unit. In order to achieve direct transfer between the buffer memories, the two input and output control units are connected to each other by a common internal bus which allows for direct data transfer between the respective buffer memories.

In the fifth preferred form of the present invention, the data in the buffer memory is not read to the main memory by the host device but shifted directly to the buffer memory of another input and output control unit provided in the subsystem. In this way, no area in the main storage is used by the dynamic device reconfiguration.

The above and other objects, features, and advantages of the present invention will become more apparent from the following detailed description with reference to the drawings.

BRIEF DESCRIPTION OF THE DRAWINGS

FIG. 17 illustrates new commands prepared in the third embodiment of the present invention;

FIG. 28 illustrates new commands prepared in the fifth embodiment of the present invention;

DETAILED DESCRIPTION OF THE PREFERRED EMBODIMENTS

Hardware Configuration and Dynamic Device Reconfiguration

Figure 1:
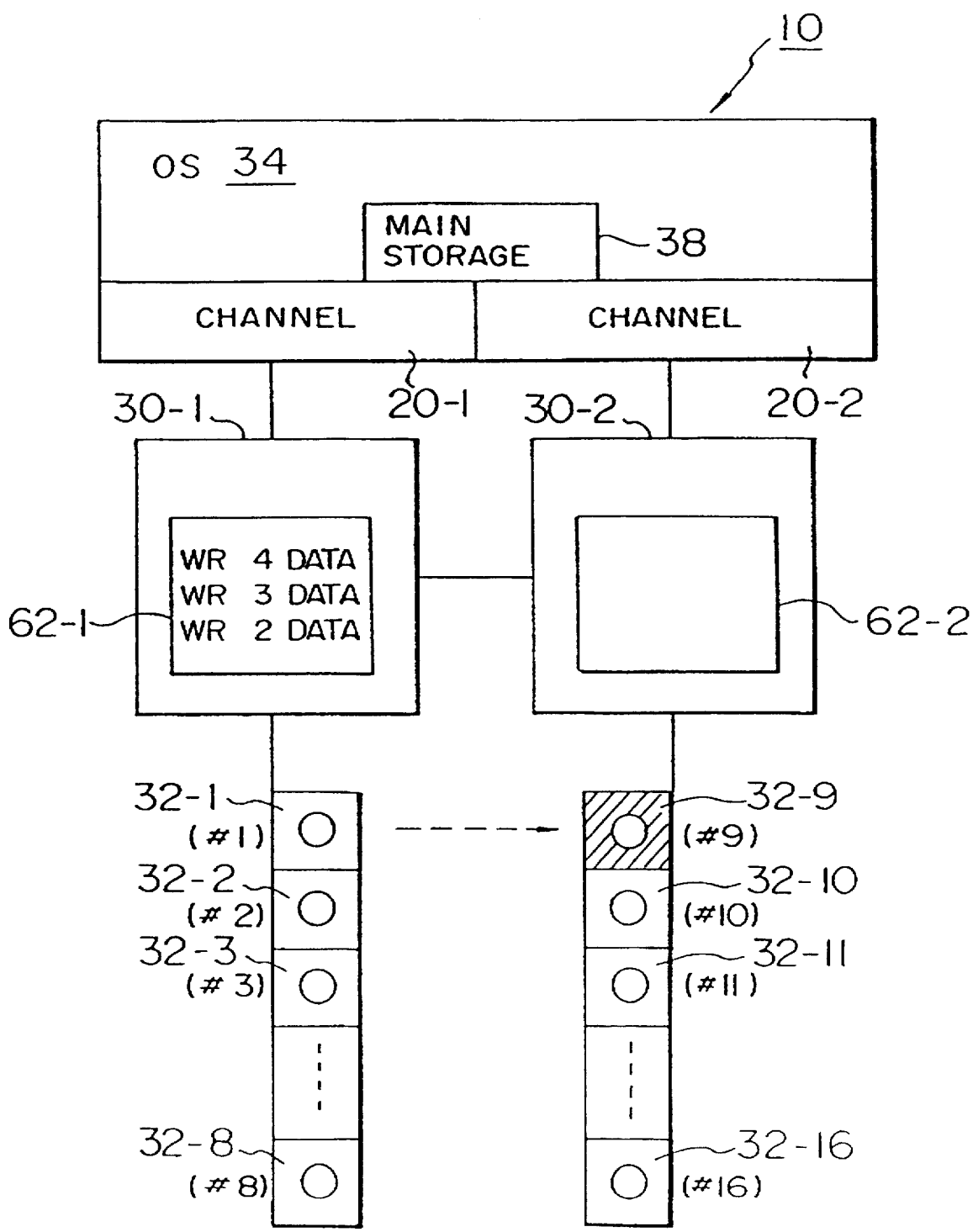
FIG. 1 is a block diagram of a conventional apparatus.
Figure 2:
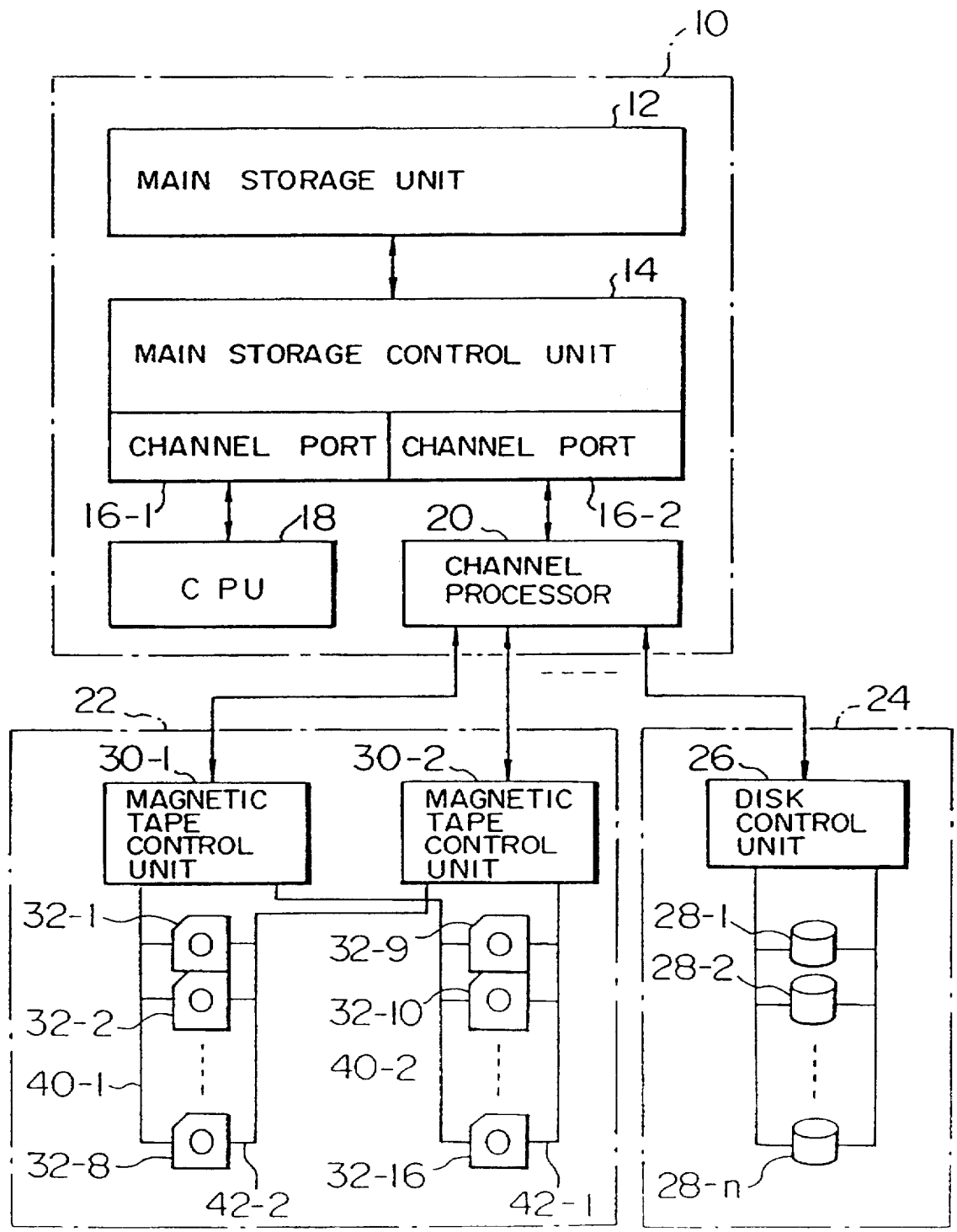
FIG. 2 is a block diagram showing the system configuration of the present invention.

FIG. 2 illustrates the hardware configuration of a computer system to which the present invention is applied. A host computer 10 contains a main storage unit 12, a main storage control unit 14, a CPU 18 and a channel processor 20. The CPU 18 is connected to a channel port 16-1 of the main storage control unit 14, and the channel processor 20 is connected to a channel port 16-2. Subsystems 22 and 24 are connected to the channel processor 20. The subsystem 22 acts as an external storage employing magnetic tape units. The subsystem 22 contains two magnetic tape control units 30-1 and 30-2. In this embodiment, eight magnetic tape units 32-1, 32-2, ... 32-8 are connected to a device path of the magnetic tape control unit 30-1. Similarly, eight magnetic tape units 32-9, 32-10 ... 32-16 are connected to a device path 42-1 of the magnetic tape control unit 30-2. The magnetic tape control units 30-1 and 30-2 are also connected to the magnetic tape units of the other magnetic tape control unit via device paths 40-2 and 42-2, respectively, so as to achieve cross call connection which assures access to all the magnetic tape units 32-1 through 32-16. F6470, manufactured by Fujitsu Ltd. may be used as the magnetic tape units 32-1 through 32-16. F1751, manufactured by Fujitsu Ltd. may be used as the magnetic tape control units 30-1 and 30-2 which are capable of cross call connection.

The subsystem 24 contains a disk control unit 26 having a device path to which a plurality of magnetic disk units 28-1, 28-2, 28-n are connected. The subsystem 24, which acts as an external storage employing the magnetic disk units, is used in a second embodiment of the present invention, which will be described later.

Figure 3:
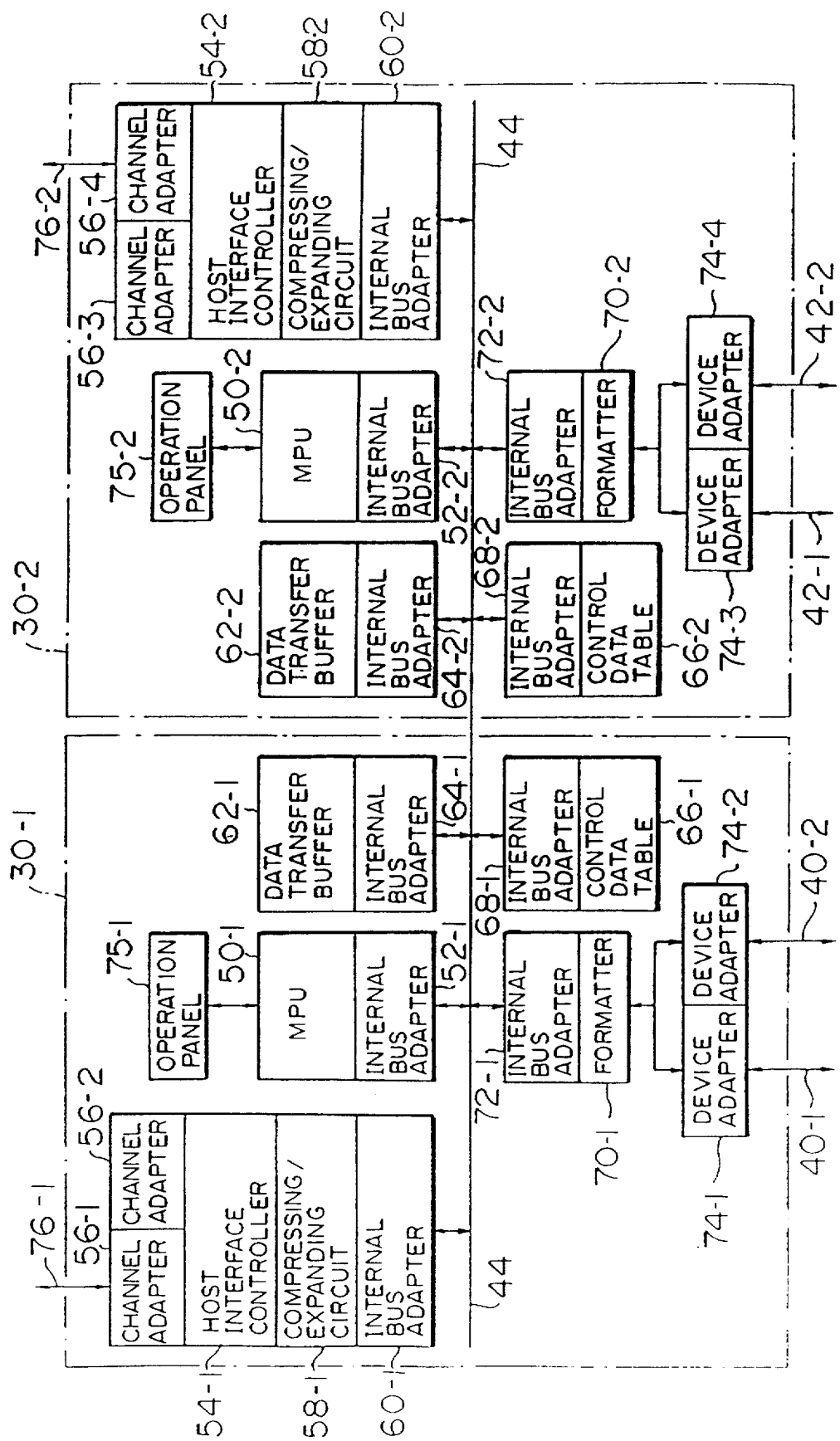
FIG. 3 is a block diagram showing a magnetic tape control unit.

FIG. 3 illustrates the magnetic tape control units 30-1 and 30-2 shown in FIG. 2 in detail. Hereinafter, the magnetic tape control unit 30-1 will be described as the typical example of the magnetic tape control units. The magnetic tape control unit 30-1 contains an MPU 50-1, a host interface controller 54-1, channel adapters 56-1 and 56-2, a compression and expansion circuit 58-1, a data transfer buffer memory 62-1, a control data table 66-1, a format unit 70-1 and device adapters 74-1 and 74-2. Further, an operation panel 75-1 is provided for the MPU 50-1. The MPU 50-1, the host interface controller 54-1 having the compression and expansion circuit 68-1, the data transfer buffer memory 52-1, the control data table 66-1 and the format unit 70-1 are connected to an internal bus 44 of the magnetic tape control unit 30-1 through internal bus adapters 52-1, 60-1, 64-1, 68-1 and 72-1, respectively. The internal bus adapters 52-1, 60-1, 64-1, 68-1 and 72-1 control transfer of data and control data between the units via the internal bus 44. The host controller 54-1 provides the interface between the host channel unit and the magnetic tape control unit through the channel adapter 56-1 and a channel path 76-1. That is, the host controller 54-1 receives write commands from the host computer and stores them in the command queue of the control data table 6601, and receives and stores data in the data transfer buffer memory 62-1.

When the MPU 50-1 executes the read commands that the magnetic tape control unit have received from the host computer, the data stored in the data transfer buffer memory 62-1 is sent out to the channel unit. The data transfer buffer memory 62-1 stores the data to be written and the data to be read in units of blocks. The control data table 66-1 acts as a common access memory for storing the control data which is exchanged between the host interface controller 54-1 and the format unit 70-1, actually, the input/output commands sent from the channel unit and the sense data with which the magnetic tape control unit responds to the channel unit.

The format unit 70-1 is an independent device controller which performs writing control, reading control and drive control on the subordinate magnetic tape units. Further, the format unit 70-1 fetches the data stored in the data transfer buffer memory 62-1, and sends it to the magnetic data unit. The format unit 70-1 also receives the data from the magnetic tape unit, and stores it in the data transfer buffer memory 62-1. The format unit 70-1 also executes error correction on the data to be read.

The format unit 70-1 also monitors generation of an error which cannot be recovered by the subsystem during writing in or reading from the magnetic tape unit. When such an unrecoverable error of the magnetic tape unit is detected, the format unit 70-1 creates a unit check status indicating generation of an error, and informs it to the host channel unit through the host interface controller 54-1. Upon receipt of this unit check status, the channel unit generates an input/output interrupt to the operating system of the host computer to inform generation of an error.

Further, the compression and expansion circuit 58-1 is provided between the internal bus adapter 60-1 and the host interface controller 54-1 as hardware. The compression and expansion circuit 58-1 compresses the data that the host interface controller 54-1 has received from the channel unit and stores the compressed data in the data transfer memory 62-1. Also, the compression and expansion circuit 58-1 expands the compressed data to be read, stored in the data transfer buffer memory 62-1, to its original data when the data is transferred to the channel unit.

As the compression method employed by the compression and expansion circuit 58-1, the binary arithmetic coding algorithm X3B5/90-254, which is the compression algorithm conforming to American National Standard (ANSI), may be used. Other compression algorithms other than the binary arithmetic coding can also be used. If the binary arithmetic coding 3B590-254 conforming to American National Standard is used in the compression and expansion circuit 58-1, it is possible to compress the original data to about 2% thereof under the optimum coding conditions.

The operation panel 75-1 provided for the MPU 50-1 has switches and displays to be used in the operations by the operator or the maintenance engineer. In the error recovery process according to the present invention, the device ID of the magnetic tape unit, designated in the dynamic device reconfiguration conducted by the operating system as the magnetic tape unit to which the cartridge discharged from the magnetic tape unit which has generated an error is to be moved, is displayed. Thus, the operator or the maintenance engineer looks at the device ID displayed on the operation panel 75-1, and shifts the cassette from the magnetic tape unit which has generated an error to another normal magnetic tape unit.

The configuration of the magnetic tape control unit 30-2 is the same as that of the above-described magnetic tape control unit 30-1.

The internal buses 44 are provided in the magnetic tape control units 30-1 and 30-2 as the common internal bus so as to allow the two magnetic control units to be operated as a single magnetic tape control unit. The provision of such a common internal bus 44 enables the data stored in, for example, the data transfer buffer memory of the magnetic tape control unit 30-1 to be directly transferred into the data transfer buffer memory 62-1 of the magnetic tape control unit 30-2 via the common internal bus 44.

Figure 4:
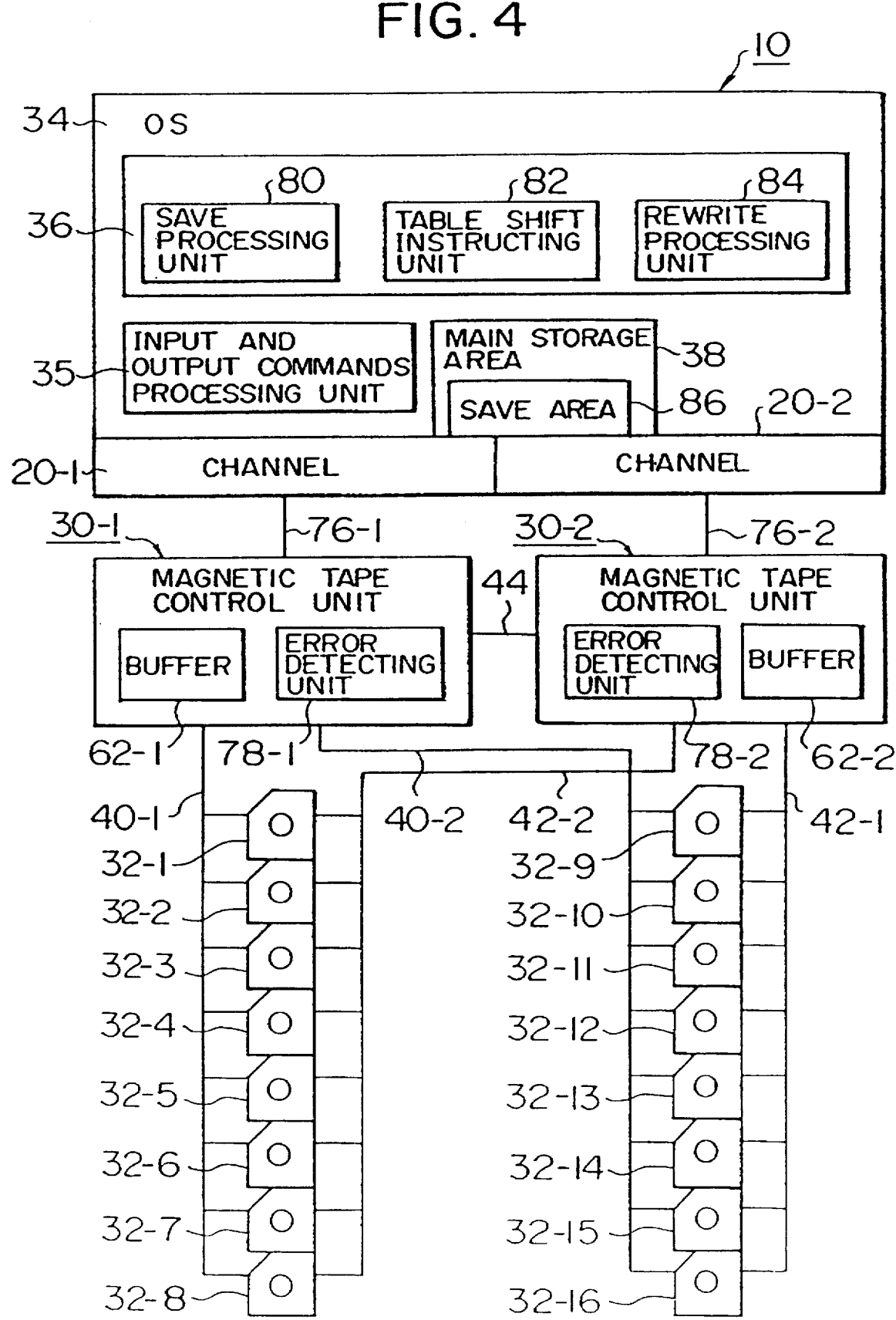
FIG. 4 is a block diagram showing the function of the present invention.

FIG. 4 illustrates the processing function of the host computer 10 and that of the magnetic tape control units 30-1 and 32-1, which are provided to implement the error recovery process according to the present invention. The function of the host computer 10 is implemented by the operating system 34 provided in the main storage. The function of the host computer 10 related to the present invention is made up of an input/output command processing unit 35 and a dynamic device reconfiguration unit 36 for executing an error recovery process. Further, a main storage area 38 having a predetermined size is reserved as the storage area that can be utilized by the user system or the operating system 34.

The dynamic device reconfiguration unit 36 contains a save processing unit 80, a tape shift instructing unit 82, and a rewriting processing unit 84. The save processing unit 80 is activated when the operating system 34 receives error information by an input/output interruption from either the channel unit 20-1 or the channel unit 20-2. For example, an error detecting unit 78-1 of the magnetic tape control unit 30-1 detects an error during writing, and issues a unit status. When the channel unit 20-1 receives this unit status and thus generates an input/output interrupt, reading of the data remaining in the data transfer buffer memory 62-1 of the magnetic tape control unit 30-1 to the main storage area 38 is performed. At that time, the save processing unit 80 reserves a save area 86 where the data remaining in the data transfer buffer memory 62-1 can be saved. The tape shift instructing unit 82 reads out the data remaining in the data transfer buffer memory 62-1 of the magnetic tape control unit 30-1 which has generated an error, in the save area 86 in the main storage area 38. Thereafter, if the error has occurred in the magnetic tape unit 32-1, the tape shift instructing unit 82 commands demounting of the cartridge to the magnetic tape unit 32-1 to allow it to discharge the cartridge. At the same time, the tape shift instructing unit 82 instructs, to the operation panel 75-1 (see FIG. 3) provided in the magnetic tape control unit 30-1, display of the device ID to which the discharged cartridge is to be shifted, e.g., display of the magnetic tape unit 32-9 of the magnetic tape control unit 30-2.

The rewrite processing unit 84 issues write commands for rewriting to the magnetic tape control unit 30-2 when it has been informed of completion of mounting of the cartridge on the magnetic tape unit 32-9 to allow the data stored in the save area 86 of the main storage area 38 to be transferred.

The write commands for rewriting are stacked in the command queue. The data is stored in the data transfer buffer memory 62-2, and then written in the magnetic tape unit 32-9 to which the cartridge has been shifted asynchronously with the host computer's access to the magnetic tape control unit. Consequently, the data is written by the error recovery process after the data which has been already written by the time the magnetic tape unit 32-1 has generated the error.

Regarding the function of the dynamic device reconfiguration unit 36 implemented by the operating system 35 of the host computer 10, the present invention intends to execute the error recovery process while minimizing the save area 86 of the main storage area 38 or without using the main storage area 38 at all, as shown in the following embodiments which will be described later.

Figure 5:
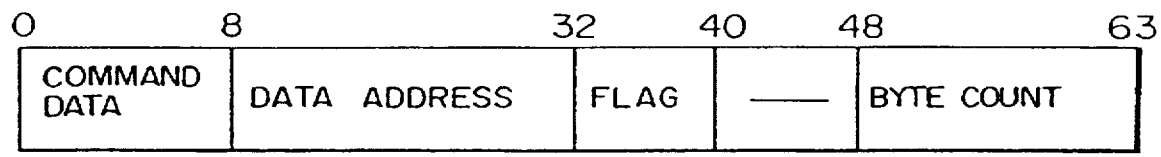
FIG. 5 illustrates a channel command word used in the present invention.

FIG. 5 illustrates a channel command word (CCW) which is issued by the channel unit 20-1 or 20-2 to the magnetic tape control unit 30-1 or 30-2 on the basis of the operating system 34 shown in FIG. 4. The channel command word is composed of command data of bit 0 to 7, a data address of bit 8 to 31, a flag of bit 32 to 39, and a byte count of bit 48 to 63. The input/output command designated by the leading command data is a basic input/output command, such as a write command, a read command, a read back command, a control command or a sense command. To issue the input/output command, when the start input/output command is received from the operating system or the user system, the address of the first channel command word in a command chain is indicated by a channel address word (CAW). The channel unit issues the channel command words (CCW) of the command chain whose first channel command word is indicated by the channel address word (CAW) to the magnetic tape control unit as the input/output command.

First Embodiment

Figure 6:
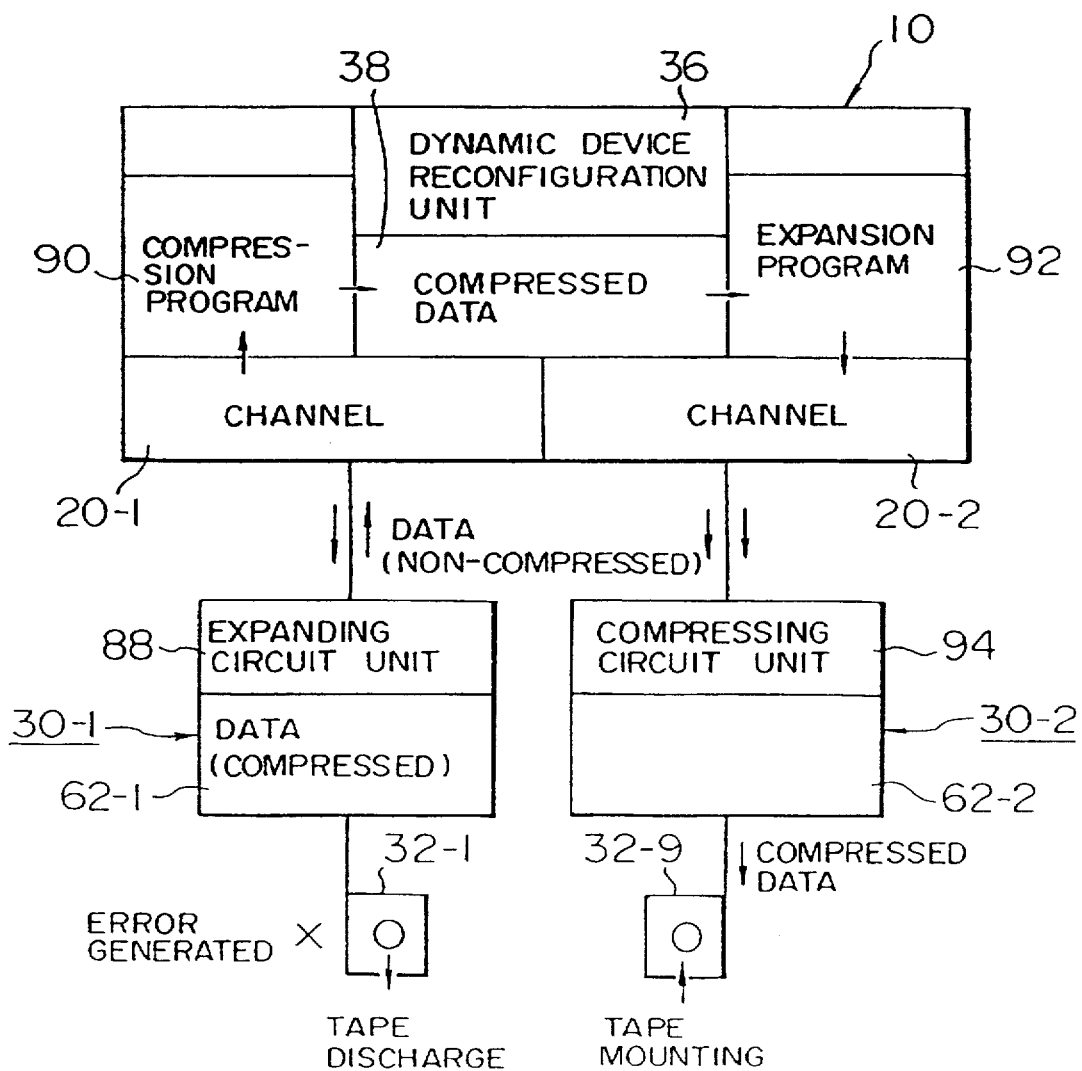
FIG. 6 is a block diagram illustrating the processing function of a first embodiment according to the present invention.

FIG. 6 illustrates a first embodiment of an error recovering function according to the present invention. In this embodiment, when the data remaining in the buffer memory of the magnetic tape control unit is read out to the save area of the main storage area by the save process of the dynamic device reconfiguration unit 36, the data, which has been sent from the magnetic tape control unit after expanded, is compressed by a compression program provided in the operating system and then stored in the save area. More specifically, in addition to the dynamic device reconfiguration unit 36 implemented by the operating system 34 of the host computer 10 shown in FIG. 4, a compression function, which is a software process achieved by a compression program 90, and an expansion function, which is a software process achieved by an expansion program 92, are provided in the host computer 10 The compression program 90 and the expansion program 92 employ, as the algorithm, the arithmetic coding algorithm, like an expansion circuit unit 88 and an compression circuit unit 94 provided as the hardware in the magnetic tape control units 30-1 and 30-2, respectively.

Thus, if an error occurs while the magnetic tape control unit 30-1 is writing the compressed data in, for example, the magnetic tape unit 32-1, the dynamic device reconfiguration unit 36 is activated, and the data remaining in the data buffer memory 62-1 is expanded to its original data by the expansion circuit unit 88 and then transferred to the host computer 10. The expanded data received by the channel unit 20-1 is compressed by the compression program 90 and then stored in the save area 86. Accordingly, the size of the save area 86 reserved in the main storage area for saving can be the same as that of all the blocks of the compressed data which remains in the data transfer buffer memory 62-1 of the magnetic tape control unit 30-1. In other words, saving does not require a large save area 86.

After the cartridge has been discharged from the magnetic tape unit 32-1 generating an error and the discharged cartridge has been mounted on the magnetic tape unit 32-9 designated as the unit to which the cartridge is shifted, the compressed data, stored in the save area 86 by the rewriting function of the dynamic device reconfiguration unit 36, is expanded by the expansion program 92 and then transferred to the magnetic tape control unit 30-2. In the magnetic tape control unit 30-2, the transferred data is compressed by the compression circuit unit 94 and then stored in the data transfer buffer memory 62-2. Thereafter, asynchronously with the host computer's access to the magnetic tape control unit 30-2, the magnetic tape control unit 30-2 writes the compressed data, stored in the data transfer buffer memory 62-2, in the magnetic tape unit 32-9 designated as the unit to which the cartridge has been shifted.

Figure 7:
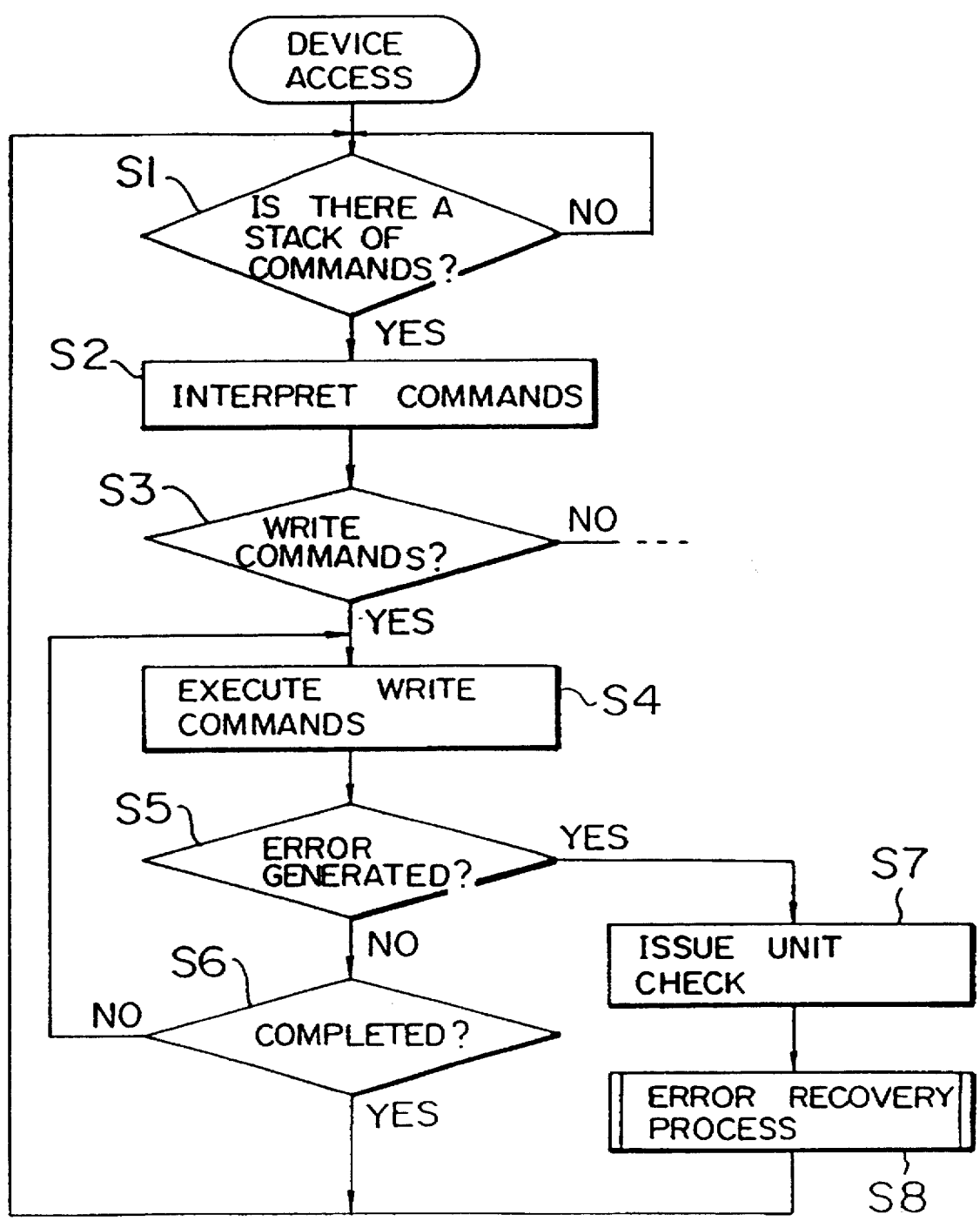
FIG. 7 is a flowchart showing the write process of a magnetic tape control unit.

FIG. 7 is a flowchart showing the operation of the magnetic tape control unit 30-1 or 30-2 performed on the magnetic tape unit in the first embodiment of the present invention. First, it is determined whether there is a command stack which has been sent from the host computer in step S1. If so, the commands are sequentially fetched and interpreted in step S2. Thereafter, it is determined whether there are write commands in the command stack in step S3. If so, the write commands are executed by sending the data to the magnetic tape unit having the designated device ID. During the execution of the write commands, the generation of an error is monitored in step S5. If there is no error, the termination response is awaited in step S6. If there is a termination response, the magnetic tape control unit asynchronously returns the device end to the channel unit as the status data.

If an unrecoverable error has occurred in the magnetic tape unit 32-1 on which writing is being performed during the execution of the write commands, the process goes to step S7, and the magnetic tape control unit 30-1 issues the unit check status to the channel unit. Subsequently, the error recovery process is performed on the basis of the error information from the channel unit 20-1 in step S8.

Figure 8:
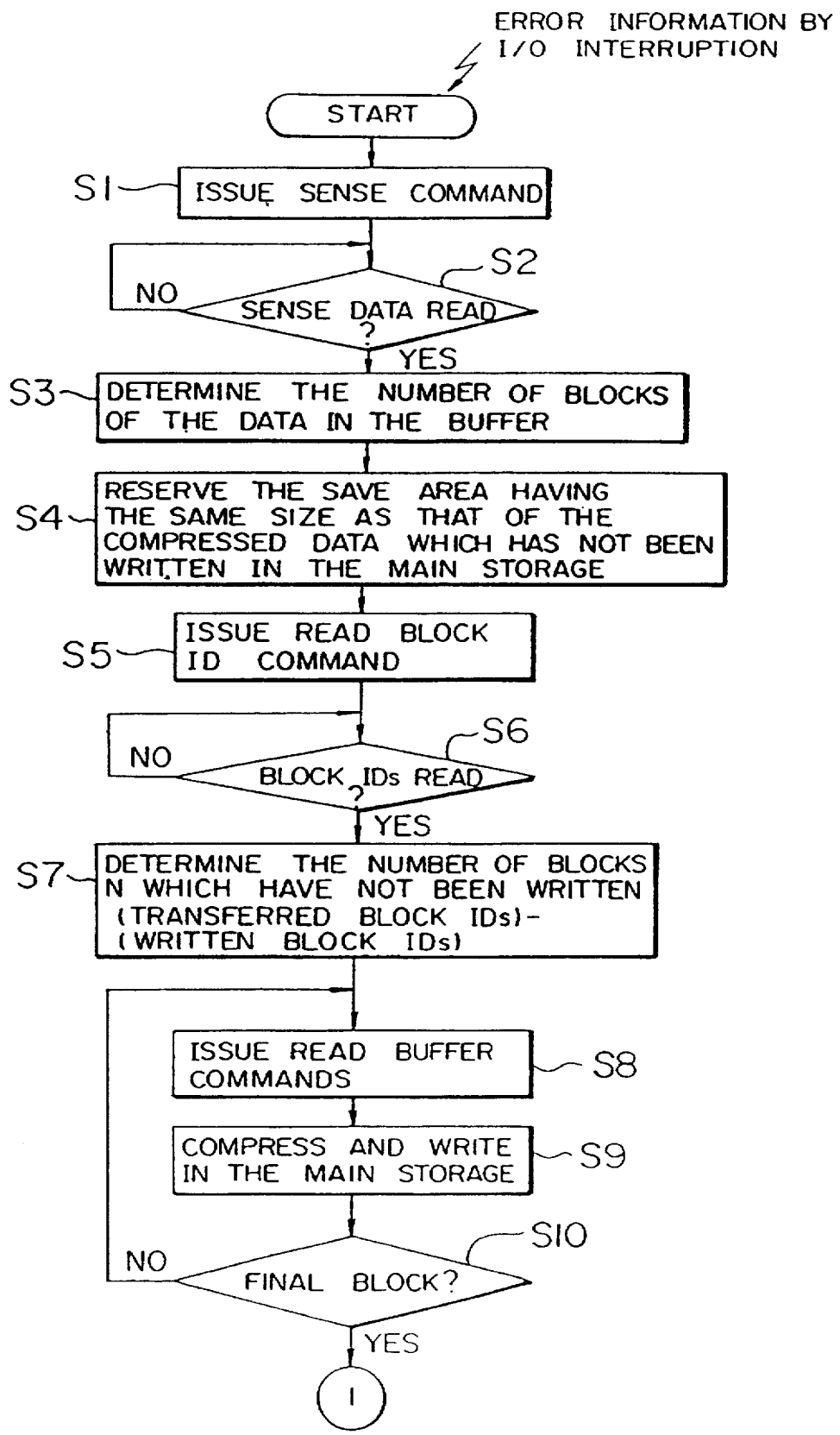
FIG. 8 is a flowchart showing the error recovery process executed in the first embodiment of the present invention.
Figure 9:
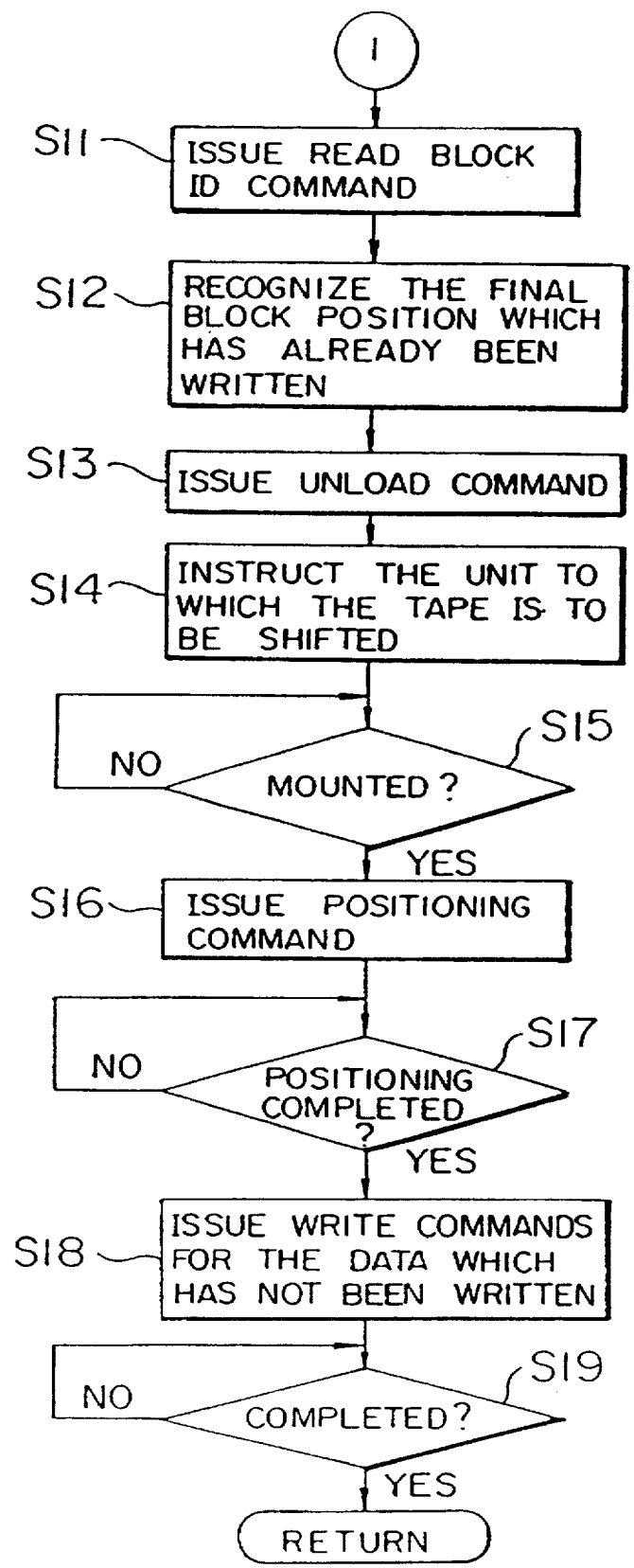
FIG. 9 is a flowchart showing the continuation of FIG. 8.

FIGS. 8 and 9 are flowcharts showing the error recovery process performed in the host computer 10 in the first embodiment shown in FIG. 6. When the channel unit 20-1 generates an input/output interruption on the basis of the unit check status from the magnetic tape control unit 30-1 to notify an error, the error recovery process is started to implement the function of the dynamic device reconfiguration unit 36 shown in FIG. 8. First, the dynamic device reconfiguration unit 36 issues a sense command in step S1 to read the sense data which is detailed data of the 32-bit unit check edited by the magnetic tape control unit 30-1.

Figure 10:
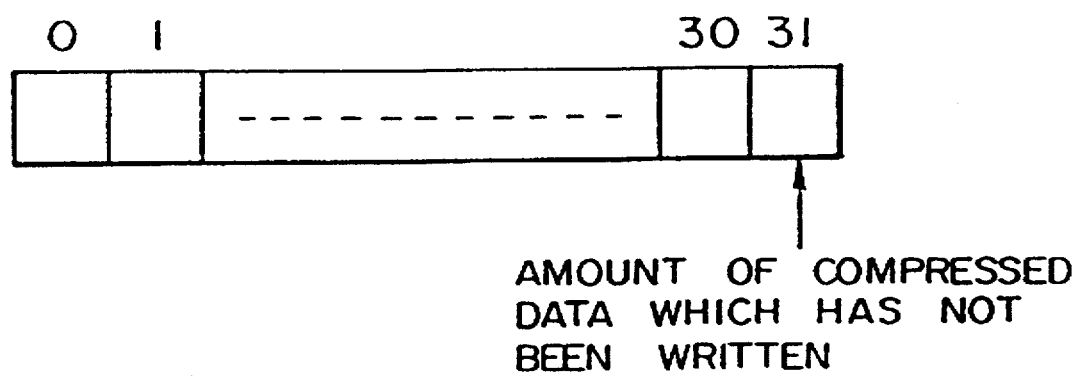
FIG. 10 illustrates sense data referred to when an error is generated in the first embodiment of the present invention.

FIG. 10 illustrates the sense data of the unit check edited by the magnetic tape control unit. A particular byte of the sense data, e.g., byte 31 thereof, indicates the amount of compressed data which has not been written and thus is present in the buffer memory. Thus, the number of compressed blocks in the buffer memory is determined in step S3, and then the save area 86 having the same size as that of the compressed data is reserved in the main storage in step S4.

Figure 11:
FIG. 11 illustrates a block ID referred to when an error is generated in the first embodiment of the present invention.

Subsequently, in step S5, the dynamic device reconfiguration unit 36 issues a read block ID command to the magnetic tape control unit 30-1. FIG. 11 illustrates block IDs prepared in the magnetic tape control unit 30-1. The block IDs are divided into 4-byte channel block IDs and 4-byte device block IDs. The channel block IDs indicate the block IDs which have been transferred from the channel unit, and the device block IDs indicate the block IDs which have been written in the magnetic tape unit.

If the block IDs are read in step S6, the number N of blocks, which have not been written and thus remain in the buffer memory, is obtained by deducting the block IDs which have been written from the block IDs which have been transferred in step S7. Thereafter, in steps S8, 9 and 10, the dynamic device reconfiguration unit 36 sequentially issues read buffer memory commands to the magnetic tape control unit 30-1 in the same number as the number of blocks which have not been written and thus remain in the buffer memory to compress the expanded data by the compression program 90 and then store the compressed data in the save area 86 in the main storage. After all the blocks, which have not yet been written and remain in the buffer memory, have been saved, the process proceeds to step S11 shown in FIG. 9.

In step S11 shown in FIG. 9, the dynamic device reconfiguration unit 36 issues a read block ID command to the magnetic tape control unit 30-1 which has informed of the error, and then recognizes the position of the last block which has been written in the cartridge of the magnetic tape unit 32-1 in step S12. Next, in step S13, the dynamic device reconfiguration unit 36 issues a demounting command to the magnetic tape unit 32-1 which has generated the error to make it discharge the cartridge. Thereafter, in step S14, the dynamic device reconfiguration unit 36 displays the device ID of the magnetic tape unit 32-9 to which the discharged cartridge is shifted in the operation panel 75-1 of the magnetic tape control unit 30-1 to press the operator or the maintenance engineer for the shift of the cartridge. If it is determined in step S15 that the cartridge has been mounted on the magnetic tape unit 32-9, the dynamic device reconfiguration unit 36 issues, to the magnetic tape control unit to which the magnetic tape unit 32-9 is subordinate, a positioning command which locates the final block position recognized in step S12 in step S16, and then awaits for the completion of positioning in step S17. If positioning is completed, the dynamic device reconfiguration unit 36 issues write commands to rewrite the data stored in the save rear 86 of the main storage area. If the dynamic device reconfiguration unit 36 receives in step S19 the device end indicating completion of the writing, series of error recovery processes are completed. Thereafter, the dynamic device reconfiguration unit 36 issues the command with which the dynamic device reconfiguration is initiated by the information of the unit check status again, and then continues the subsequent process.

Thus, in this embodiment, after the compressed data which remains in the data transfer buffer memory is expanded and then transferred to the host computer, the data is compressed by the software, and then stored in the save area of the main storage area. Consequently, if the compression and expansion performed by the hardware of the magnetic tape control unit are the same as those executed by the software of the host computer, the size of the save area can be the same as the size of the compressed blocks which have not been written and thus remain in the data transfer memory. Thus, it is not necessary for an enormous save area to be reserved in the main storage area, which would be required when compression and expansion of data are executed, and failure of the dynamic device reconfiguration or interruption of another jobs, due to the reservation of an enormous save area, can thus be avoided.

Second Embodiment

Figure 12:
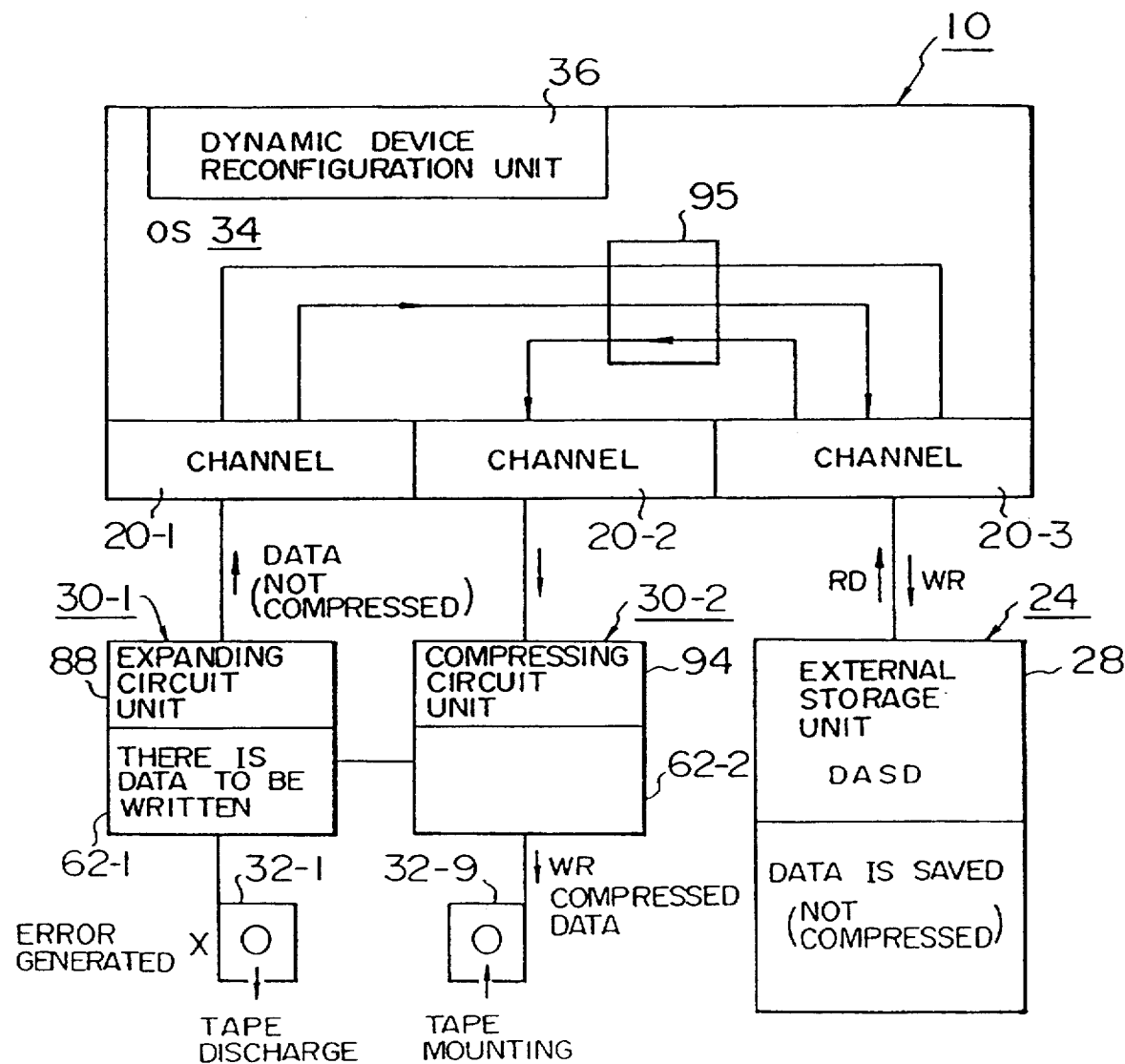
FIG. 12 is a block diagram showing the processing function of second embodiment of the present invention.

FIG. 12 illustrates a second embodiment of the error recovery process function according to the present invention. This embodiment is characterized in that in the save process conducted when an error occurs, the data is not saved in the main storage area but transferred to and saved in another subsystem which employs magnetic disk units or the like.

In FIG. 12, the dynamic device reconfiguration unit 36 implemented by the operating system 34 of the host computer 10 includes the save processing unit 80, the tape shift instructing unit 82 and the rewrite processing unit 84, as in the case of the dynamic device reconfiguration unit 36 shown in FIG. 4. In the save process, the save processing unit 80 first reserves, in the main storage area, a work area 95 having the same size as that of the maximum blocks of the data remaining in the data transfer buffer memory 62-1 of the magnetic tape control unit 30-1 which has generated an error. Next, the save processing unit 80 saves, via the work area 95, the data in the external storage of another subsystem 24, e.g., the magnetic disk unit 28. At that time, the data is expanded by the expansion circuit unit 88 of the magnetic tape control unit 30-1, and the expanded data is saved in the magnetic disk unit 28 of the subsystem 24 via the work area 95 reserved in the main storage area. Thereafter, the tape shift instructing unit 82 performs discharge of the cartridge from the magnetic tape unit 32-1 which has generated the error and instruction of the mounting of the discharged cartridge on the magnetic tape unit 3209 which is subordinate to the magnetic tape control unit 32-2 in the same manner as that of the tape shift instructing unit 82 of the first embodiment.

After the mounting of the cartridge is completed, the rewrite processing unit 84 issues reading commands in the same number as that of the blocks to the magnetic disk unit 28 of the subsystem 24 in which the data has been saved to write the data in the magnetic tape unit 32-9 of the magnetic tape control unit 30-2 via the work area 95.

Figure 13:
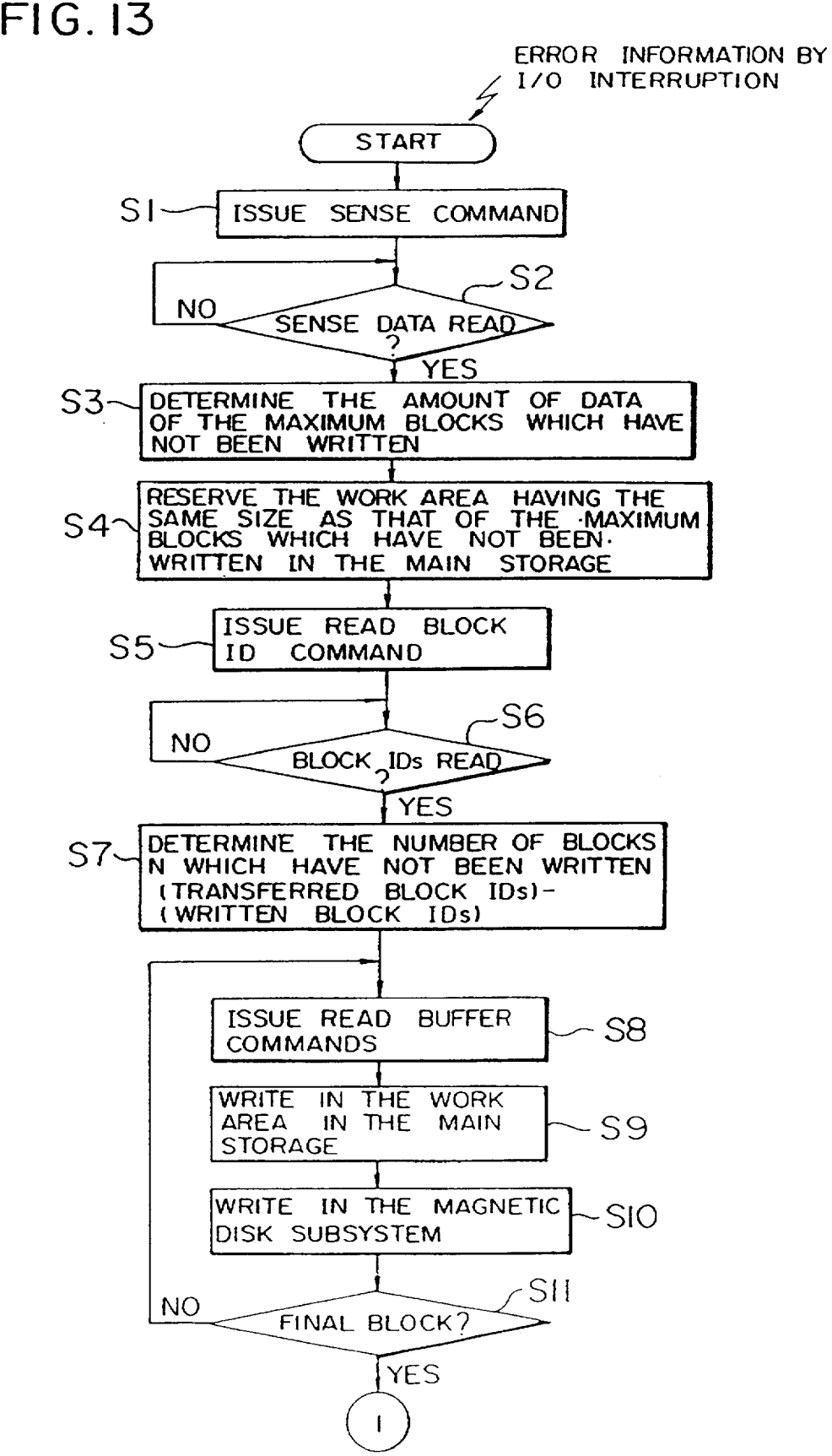
FIG. 13 is a flowchart showing the error recovery process executed in the second embodiment of the present invention.
Figure 14:
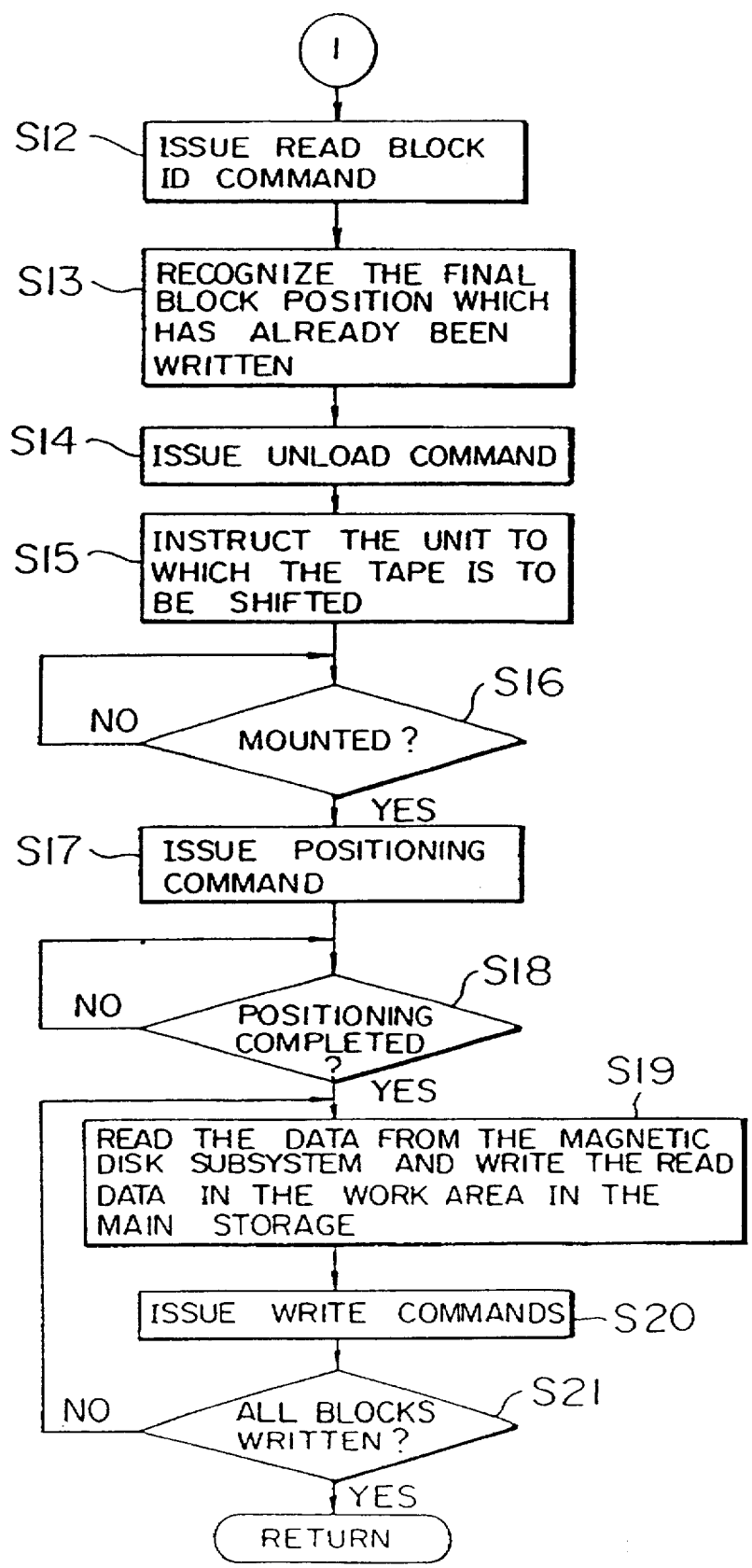
FIG. 14 is a flowchart showing the continuation of FIG. 13.
Figure 15:
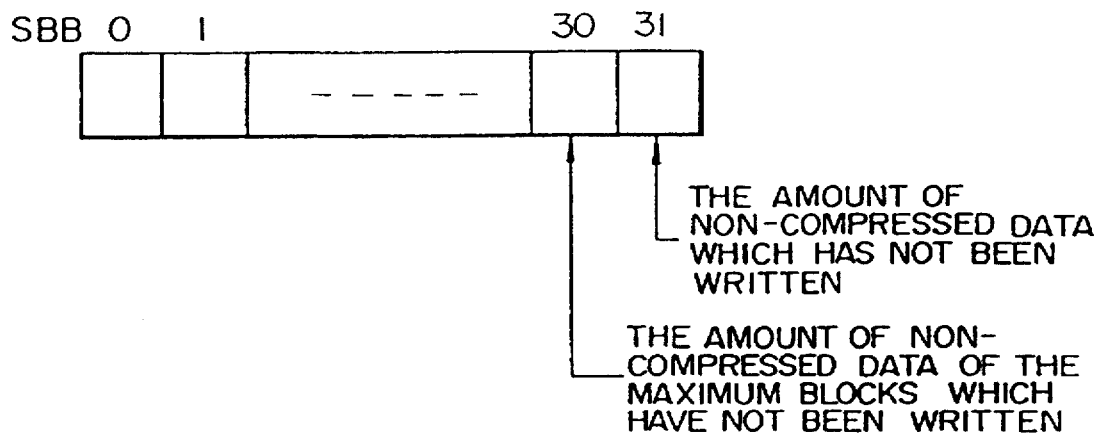
FIG. 15 illustrates the sense data referred to when an error is generated in the second embodiment of the present invention.

FIGS. 13 and 14 are flowcharts showing the error recovery process conducted by the dynamic device reconfiguration unit 36 implemented by the operating system 24 of the second embodiment shown in FIG. 12. When the magnetic tape control unit 30-1 sends the machine check status to the channel unit 20-1 on the basis of an error generated in the magnetic tape unit 32-1, the channel unit 20-1 generates an input/output interruption to the operating system 34 to inform the generation of the error, whereby the process shown in FIG. 13 is started. First, the dynamic device reconfiguration unit 36 issues the sense command in step S1. If the dynamic device reconfiguration unit 36 has read the sense data in step S4, it determines the amount of data in the maximum blocks in step S3. At that time, the unit check sense data shown in FIG. 15 is prepared in the magnetic tape control unit 30-1. In the sense data, byte 31 indicates the amount of non-compressed data which has not been written, and byte 30 indicates the amount of non-compressed data in the maximum blocks which have not been written. Thus, the dynamic device reconfiguration unit 36 determines, from the sense data, the amount of data in the maximum blocks which have not been written and thus remains in the buffer memory 62-1, and reserves the work area 95 having the same size as that of the maximum blocks which have not been written in the main storage in step S4. Subsequently, in steps S5 through S7, the block IDs of the magnetic tape control unit 30-1 are read, and the number N of blocks which have not been written is determined. Next, in steps S8 through S11, the dynamic device reconfiguration unit 36 issues the read buffer memory commands in the same number as that of the blocks which have not been written, writes the data in the work area 95 of the main storage from the buffer memory 62-1, and then writes the data in the magnetic disk unit 28 of the subsystem 24. By the time the data is written in the magnetic disk unit 28, the save area corresponding to the amount of non-compressed data, indicated by byte 31 of the sense data shown in FIG. 15, is reserved in the magnetic disk unit 28.

After the final block which has not been written is transferred to the magnetic disk unit 28 in step S11, the process goes to step S12 shown in FIG. 14, and the dynamic device reconfiguration unit 36 issues the read block ID command. Thereafter, the dynamic device reconfiguration unit 36 recognizes the final block position which has been written in step S13, and issues the demounting command in step S14 to make the magnetic tape unit 32-1 which has generated the error discharge the cartridge. Thereafter, the dynamic device reconfiguration unit 36 displays the device ID of the magnetic tape unit 32-9 to which the cartridge is shifted in the operation panel in step S15. Next, if it is determined in step S16 that the cartridge has been mounted on the magnetic tape unit 32-9, the dynamic device reconfiguration unit 36 issues the positioning command which locates the final block position which has been written, recognized in step S14 in step S17. If it is determined that positioning has been completed in step S18, the dynamic device reconfiguration unit 36 reads the data for each command from the magnetic disk unit 28 and writes it in the data transfer buffer memory 62-2 of the magnetic tape control unit 30-2 via the work area 95 reserved in the main storage in step S19. Next, in step S20, the dynamic device reconfiguration unit 36 issues the write command to write the data in the magnetic tape unit 32-9 to which the cartridge has been mounted. The processes in steps S19 and 20 are repeated until all the blocks have been written. When all the blocks have been transferred, the channel end is issued, and the commands from the host computer 10 are completed.

Thereafter, the write commands are sequentially read from the command queue, and write of the data stored in the data transfer buffer memory 62-2 in the magnetic tape unit 32-9 is performed asynchronously. Once the channel end is issued, the operating system 34 of the host computer 10 returns to the subsequent process which has been interrupted to execute the error recovery process.

Third Embodiment

Figure 16:
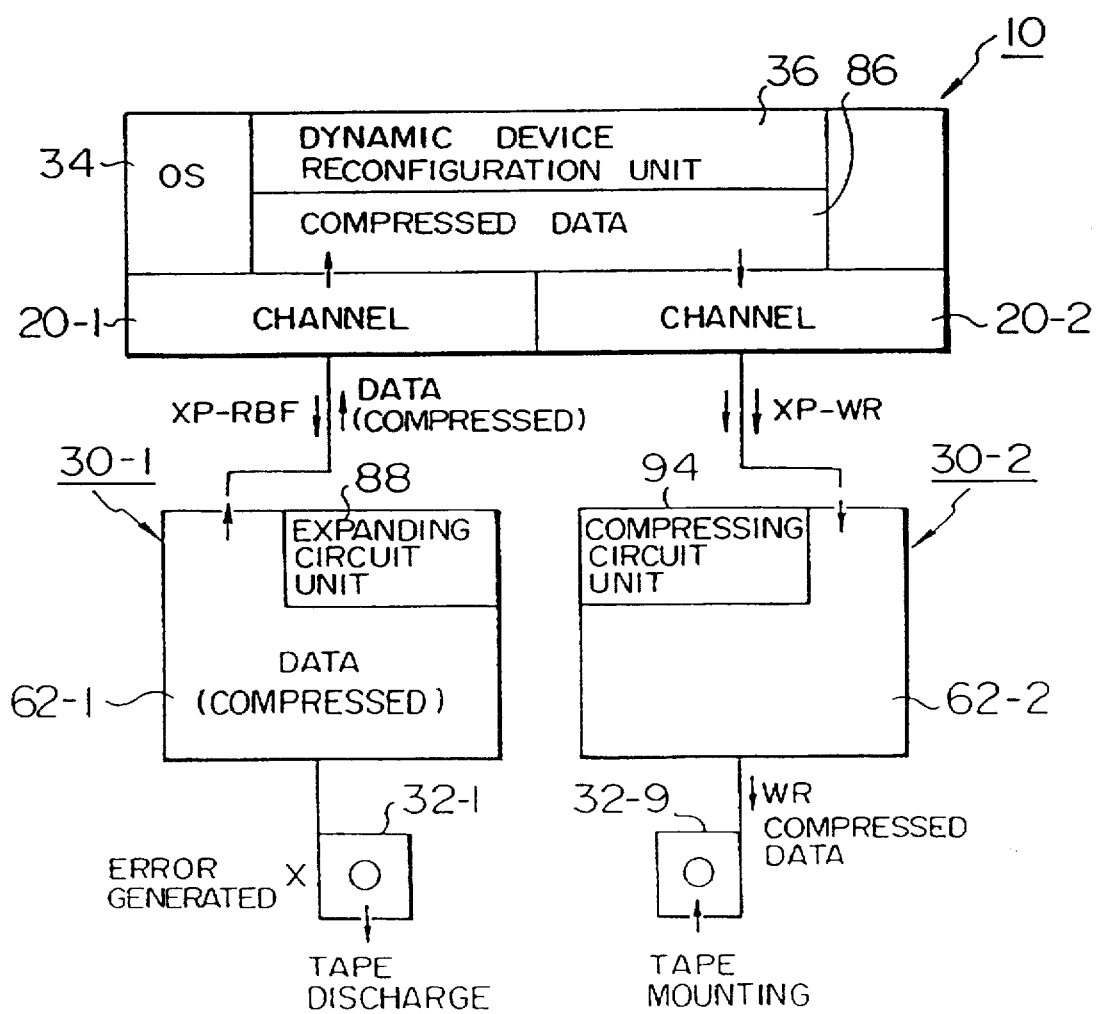
FIG. 16 is a block diagram showing the processing function of a third embodiment of the present invention.

FIG. 16 illustrates the error recovering function of a third embodiment of the present invention. In this embodiment, when an error occurs, the data, remaining in the data transfer memory in the compressed state when an error is generated, is saved in the main storage area and the saved data is rewritten in the magnetic tape unit to which the tape has been shifted without the data expanded and compressed. To achieve this, commands shown in FIG. 17 are prepared in the operating system 34 of the host computer 10. A read command with an expansion inhibiting function appended (XP-RBF) is issued to read the data in the data transfer buffer to the main storage without executing expansion by the expansion circuit unit 88. A write command with a compression inhibiting function appended (XP-WR) is issued to write the data, saved in the main storage, in the data transfer buffer memory of another magnetic tape control unit without performing compression.

More specifically, when the dynamic device reconfiguration unit 36 implemented by the operating system 34 of the host computer 10 is informed that an error has occurred in, for example, the magnetic tape device 32-1, it issues the read commands with the expansion inhibiting function appended (XP-RBF), shown in FIG. 17, in the same number as that of the blocks of the data remaining in the data transfer buffer memory 62-1 to transfer the compressed data in the save area 86 reserved in the main storage area without expanding it by the expansion circuit 88.

For rewriting, the dynamic device reconfiguration unit 36 issues the write commands with the compression inhibiting function appended (CP-WR) to the magnetic tape control unit 30-2 to which the magnetic tape unit 32-9 is subordinate in the same number as that of the saved blocks to transfer the compressed data in the data transfer buffer memory 62-2 without compressing the data by the compression circuit unit 94. Thereafter, the magnetic tape control unit 30-2 writes the data in the magnetic tape unit 32-9 to which the cartridge has been shifted asynchronously with the transfer.

Thus, since the data remaining in the data transfer buffer memory 62 in a compressed state is read in the save area 86 reserved in the main storage area without the data being changed, the size of the save area 86 can be the same as the size of the blocks in the data transfer buffer memory 62-2 which have not been written, and the size of the save area reserved in the main storage area can thus be minimized.

Figure 18:
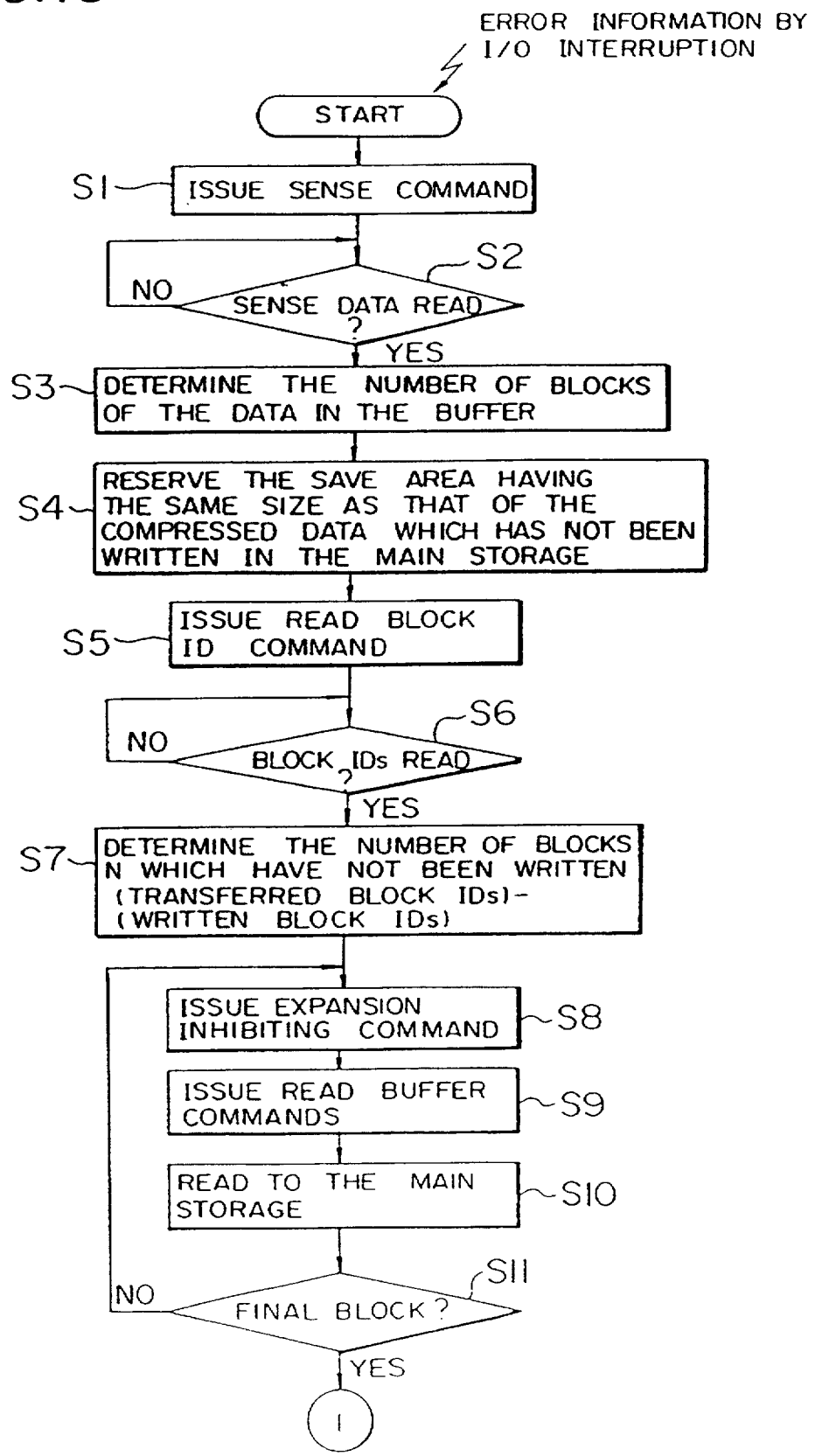
FIG. 18 is a flowchart showing the error recovery process executed in the third embodiment of the present invention.
Figure 19:
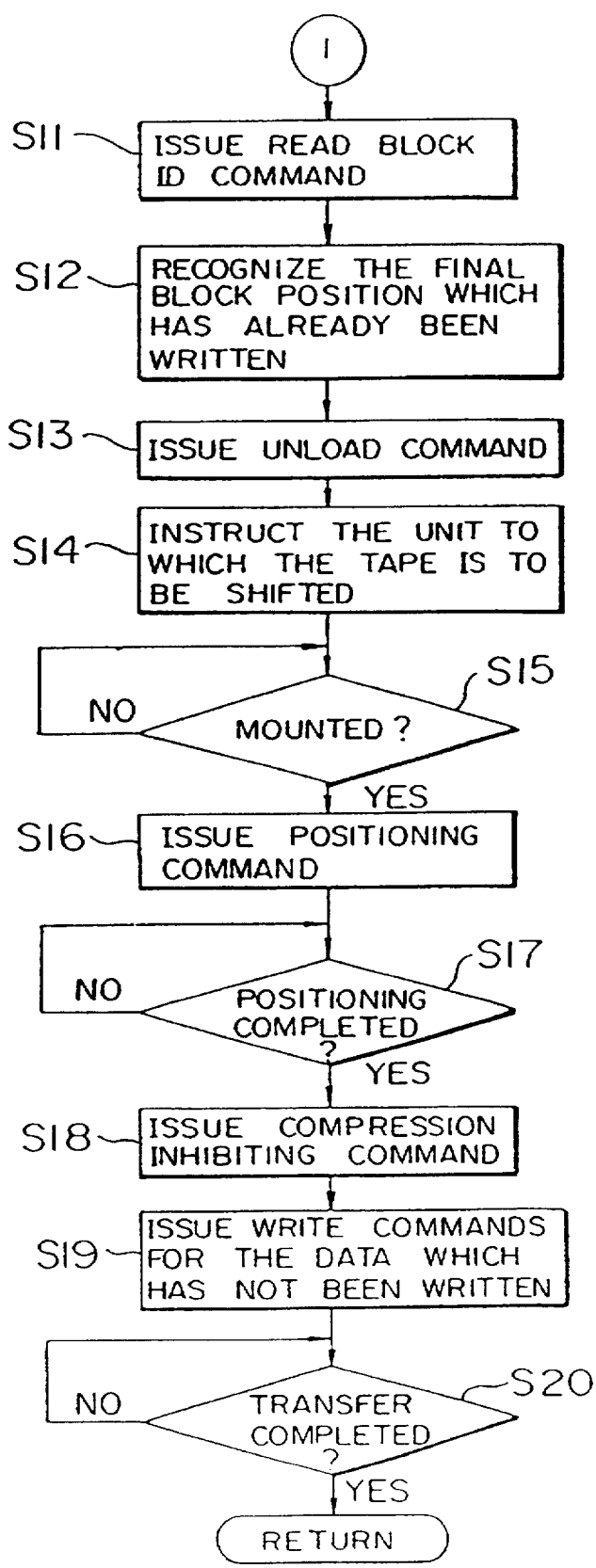
FIG. 19 is a flowchart showing the continuation of FIG. 18.

FIGS. 18 and 19 are flowcharts showing the error recovery process performed by the dynamic device reconfiguration unit 36 provided in the host computer 10 shown in FIG. 16. This error recovery process is the same as that of the first embodiment, shown in FIGS. 8 and 9, except that the read commands with the expansion inhibiting function appended (XP-RBF) are issued in step S8 shown in FIG. 18 and that the write commands (XP-ER) with the compression inhibiting function appended are issued in step S18 shown in FIG. 19.

Fourth Embodiment

Figure 20:
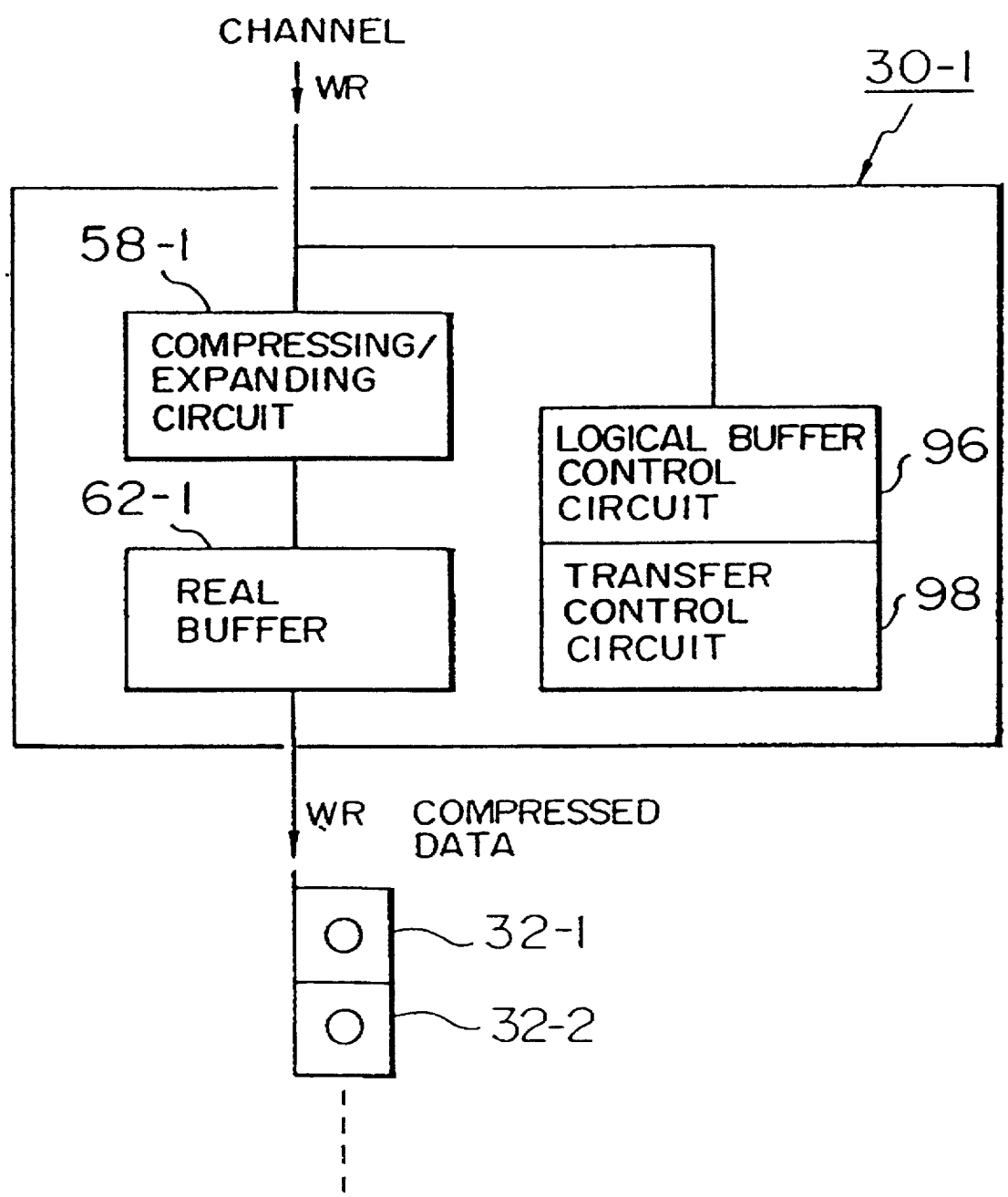
FIG. 20 is a block diagram showing the function of the magnetic tape control unit in a fourth embodiment of the present invention.

FIG. 20 shows the function of the magnetic tape control unit 30-1 in a fourth embodiment of the present invention. In this embodiment, a logical buffer memory control circuit 96 and a transfer control circuit 98 are provided in the magnetic tape control unit 30-1 in order to restrict the size of the original non-compressed data, corresponding to the compressed data remaining in the data transfer buffer memory (real buffer memory) when an error has been generated, within a fixed value.

Figure 21:
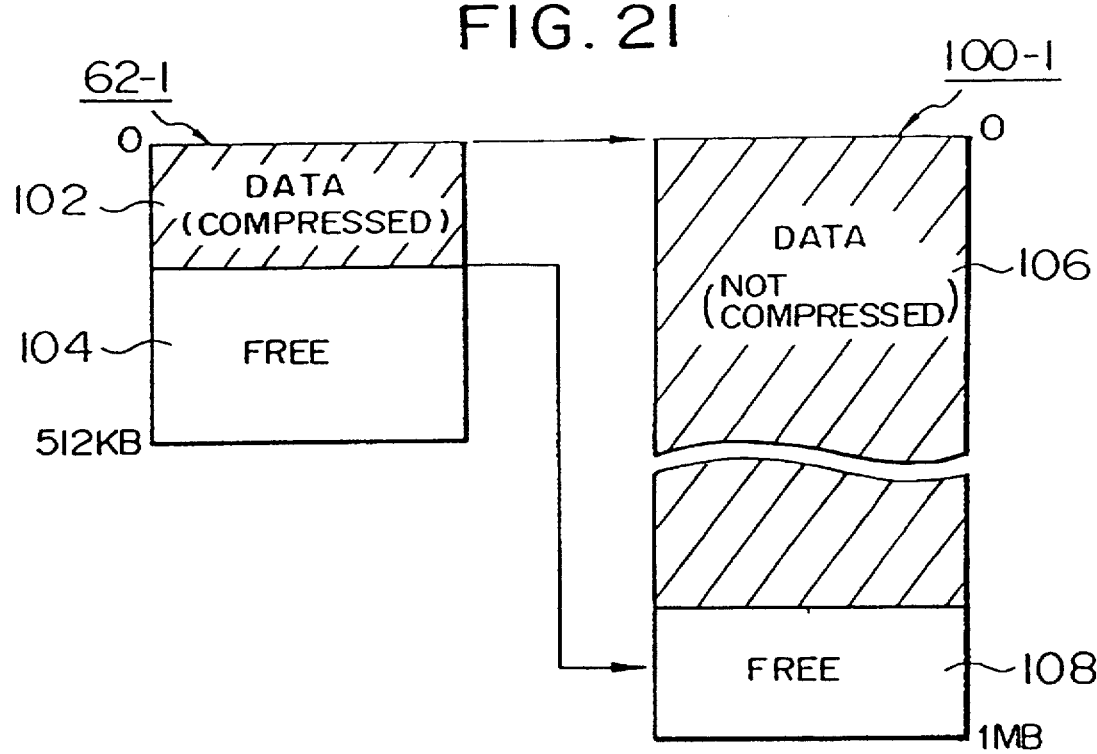
FIG. 21 illustrates a real buffer memory and a logical buffer memory in the fourth embodiment of the present invention.

FIG. 21 illustrates the relationship between a logical buffer memory controlled by the logical buffer memory control circuit 96 shown in FIG. 20 and the data transfer buffer memory 62-1 which is a physically existing real buffer memory. In the state shown in FIG. 21, compressed data 102 which has not been written, indicated by the hatched portion, is stored in the real buffer memory 62-1. The data 102 which has not been written is the data which is waiting for its turn to be written in the magnetic tape unit and which is to be saved in the main storage area when an error is generated. The logical buffer memory control circuit 96 manages a virtual logical buffer memory 100-1 having a predetermined size expressed in terms of the original non-compressed data. The capacity of the logical buffer memory 100-1 is fixed to, for example, 1 MB.

Figure 22:
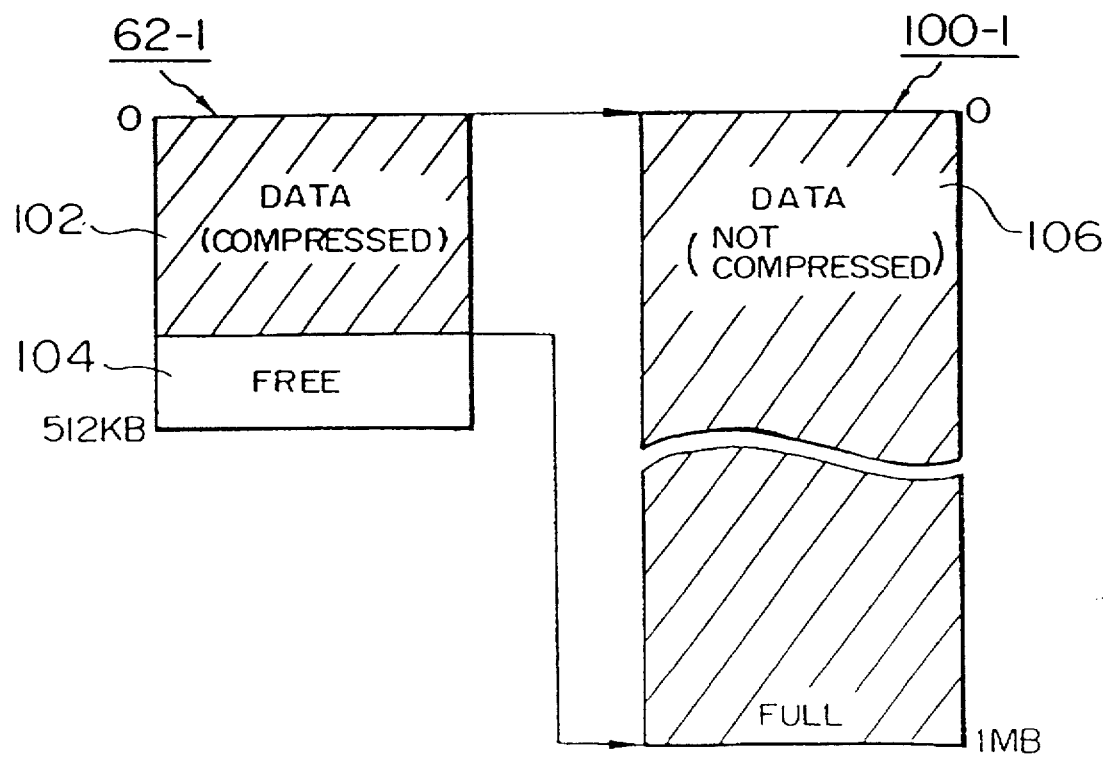
FIG. 22 illustrates the full state of the logical buffer memory.

The logical buffer memory control circuit 96 cumulatively stores, in the virtual logical buffer memory 100-1, data 106 which is the original data corresponding to the compressed data 102 written in the real buffer memory 62-1, as indicated by the hatched portion, each time the data transfer request is received. The transfer control circuit 98 determines whether or not there is a free area 108 in the logical buffer memory 100-1. If there is the free area 108, the transfer control circuit 98 returns the ready signal to the channel unit to allow for data transfer. If the logical buffer memory 100-1 is full and there is no free area, as shown in FIG. 22, the transfer control circuit 98 returns the busy signal to inhibit data transfer. Further, each time the compressed data is written in either the magnetic tape unit 32-1, 32-2, . . . , the logical buffer memory circuit 96 removes, from the logical buffer memory 100-1, the original data corresponding to the compressed data which has been written.

Figure 23:
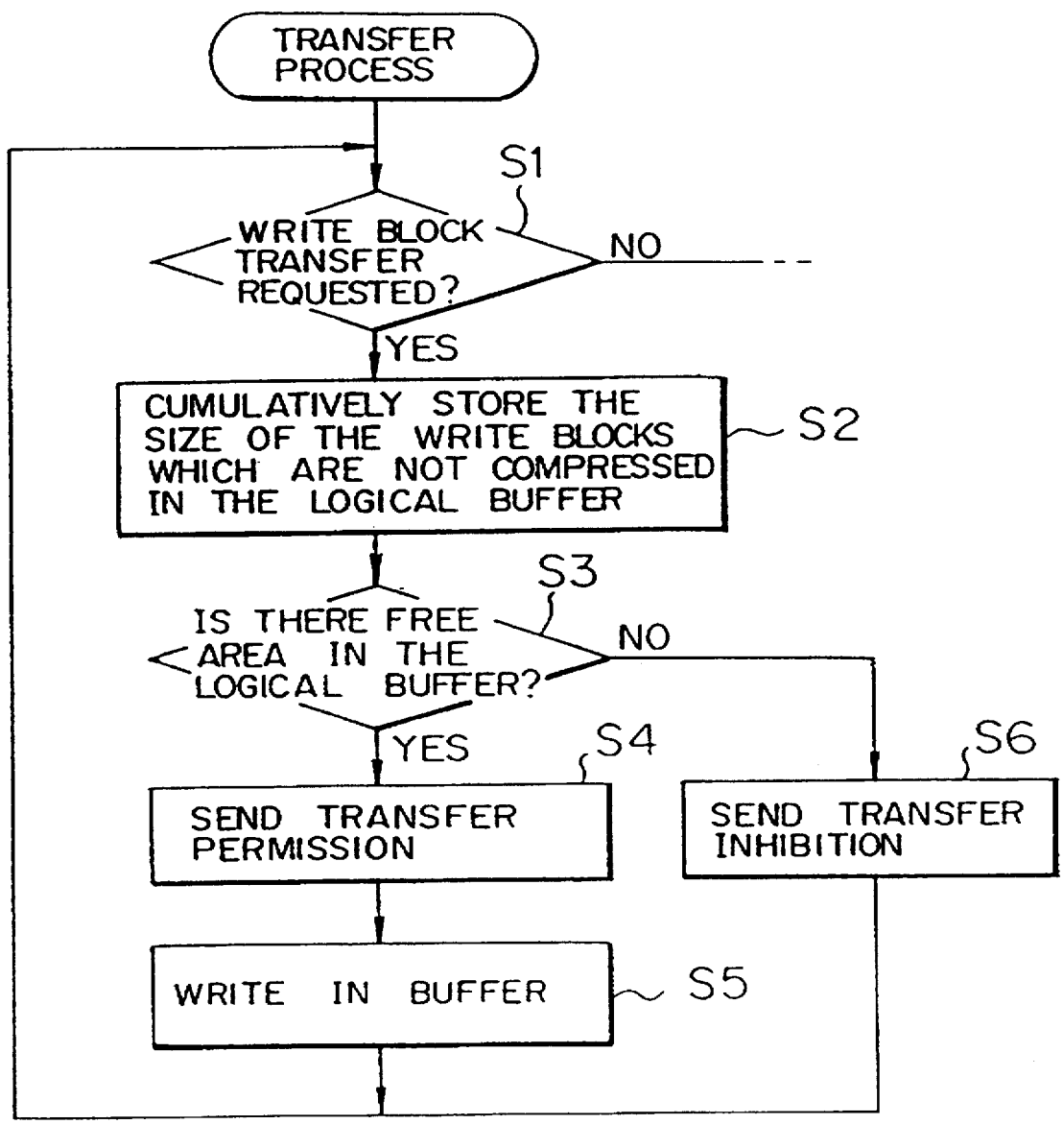
FIG. 23 is a flowchart showing the transfer process based on the logical buffer memory control in the fourth embodiment of the present invention.

FIG. 23 is a flowchart showing the operation of the logical buffer memory control circuit 96 and the operation of the transfer control circuit 98 in the fourth embodiment according to the present invention. First, it is determined whether or not there is a transfer request of blocks from the channel unit in step S1. If there is a transfer request, the logical buffer memory control circuit 96 cumulatively stores the blocks which are not yet compressed in the logical buffer memory 100-1 in step S2. Thereafter, the transfer control circuit 98 determines whether or not there is a free area in the logical buffer memory 100-1 to which the data has been cumulatively stored in step S3. If there is a free area, the transfer control circuit 98 returns the ready signal to allow for data transfer in step S4. Thereafter, the transferred blocks are written in the real buffer memory 62-1 in step S5. If it is determined that there is no free area in the logical buffer memory 100-1 in step S3, the transfer control circuit 98 returns the busy signal to the channel unit to inhibit data transfer. The transfer inhibit state continues until writing of data from the real buffer memory 62-1 in the subordinate magnetic tape unit is completed and there is a free area in the logical buffer memory 100-1.

Figure 24:
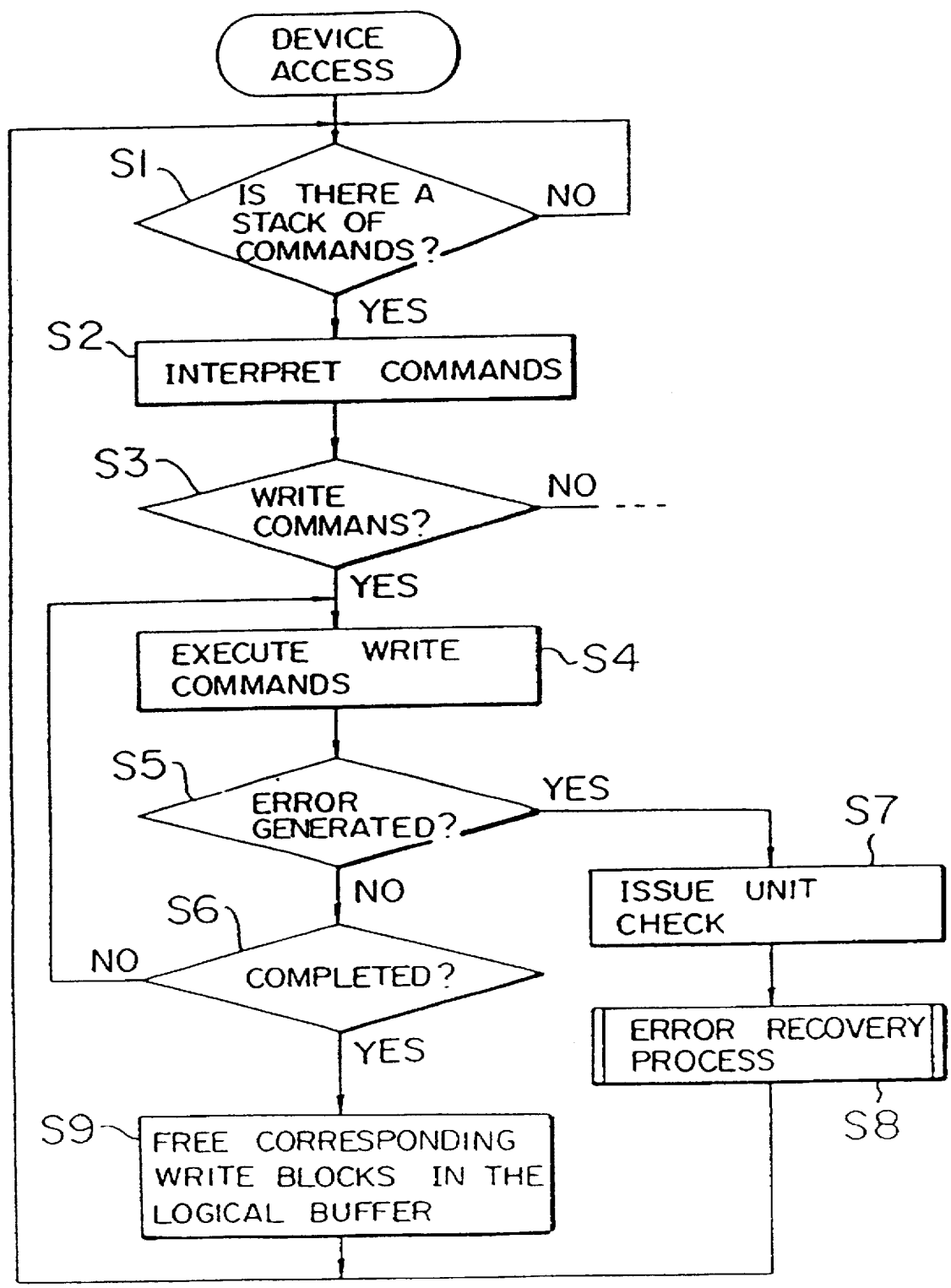
FIG. 24 is a flowchart showing the write process of the magnetic tape control unit in the fourth embodiment of the present invention.

FIG. 24 is a flowchart showing the device access process performed by the magnetic tape control unit 30-1 to the magnetic tape unit subordinate thereto in the fourth embodiment of the present invention shown in FIG. 20. This device access process including the error recovery process is the same as that of the first embodiment shown in FIG. 7 up to step 8. In this embodiment, in addition to the device access process shown in FIG. 7, emptying of the corresponding original blocks from the logical buffer memory is performed when writing in the magnetic tape unit is completed and the device end is thereby obtained. Although FIG. 20 shows the magnetic tape control unit 30-1, the magnetic tape control unit 30-2 has the same structure.

In this embodiment, it is controlled by the size of the original data that the compressed data stored in the data transfer buffer memory 62-1 of the magnetic tape control unit 30-1 does not exceed a fixed size. Accordingly, even if an error occurs during writing in the magnetic tape unit, the size of the save area 86 reserved in the main storage area of the host computer can be predetermined (which corresponds to the size of the logical buffer memory), and failure of the dynamic device reconfiguration due to failure in the provision of the save area or interruption of other jobs by the provision of an enormous save area can thus be avoided.

Figure 25:
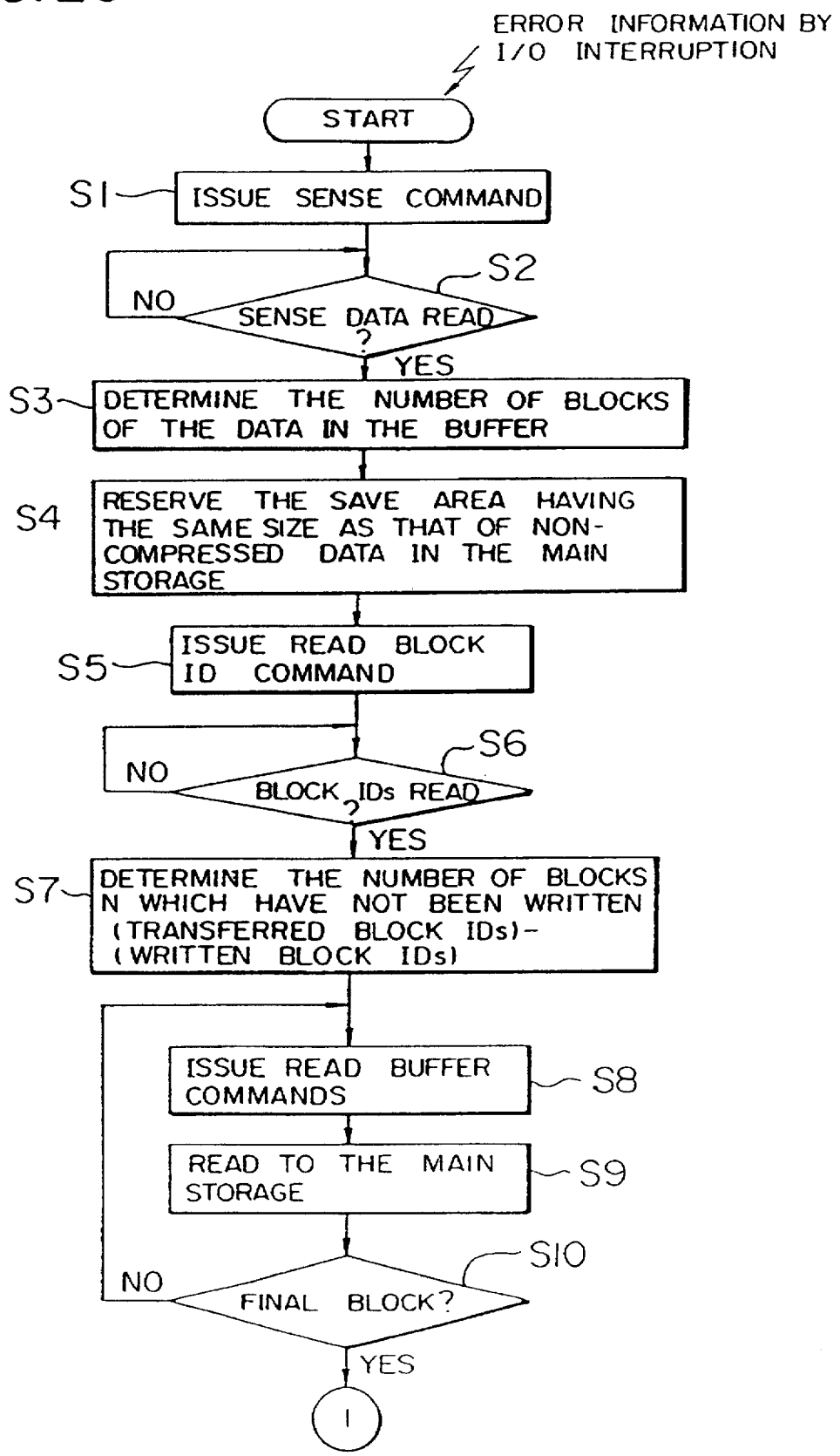
FIG. 25 is a flowchart showing the error recovery process executed in the fourth embodiment of the present invention.
Figure 26:
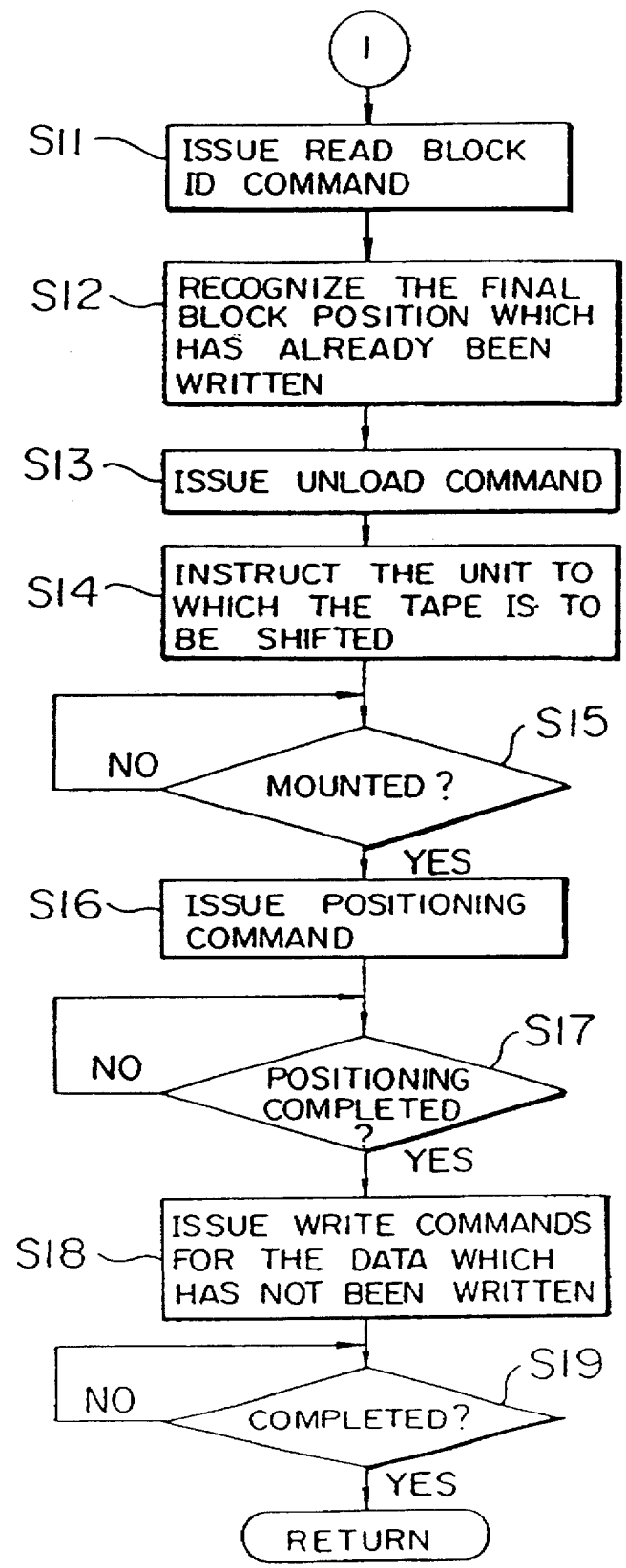
FIG. 26 is a flowchart showing the continuation of FIG. 25.

FIGS. 25 and 26 are flowcharts showing the error recovery process performed by the dynamic device reconfiguration unit 36 of the fourth embodiment according to the present invention. This error recovery process is the same as that of the first embodiment shown in FIGS. 8 and 9 except that the save area 86 having the size corresponding to the size of the data which is not yet compressed is rserved in the main storage in step S4, that the compressed data in the buffer memory is expanded and then read in the save area of the main storage in step S9, and that the original data transferred from the save area to the magnetic tape control unit is compressed and then stored in the data transfer buffer memory of the magnetic tape control unit in step S18 shown in FIG. 26.

Fifth Embodiment

Figure 27:
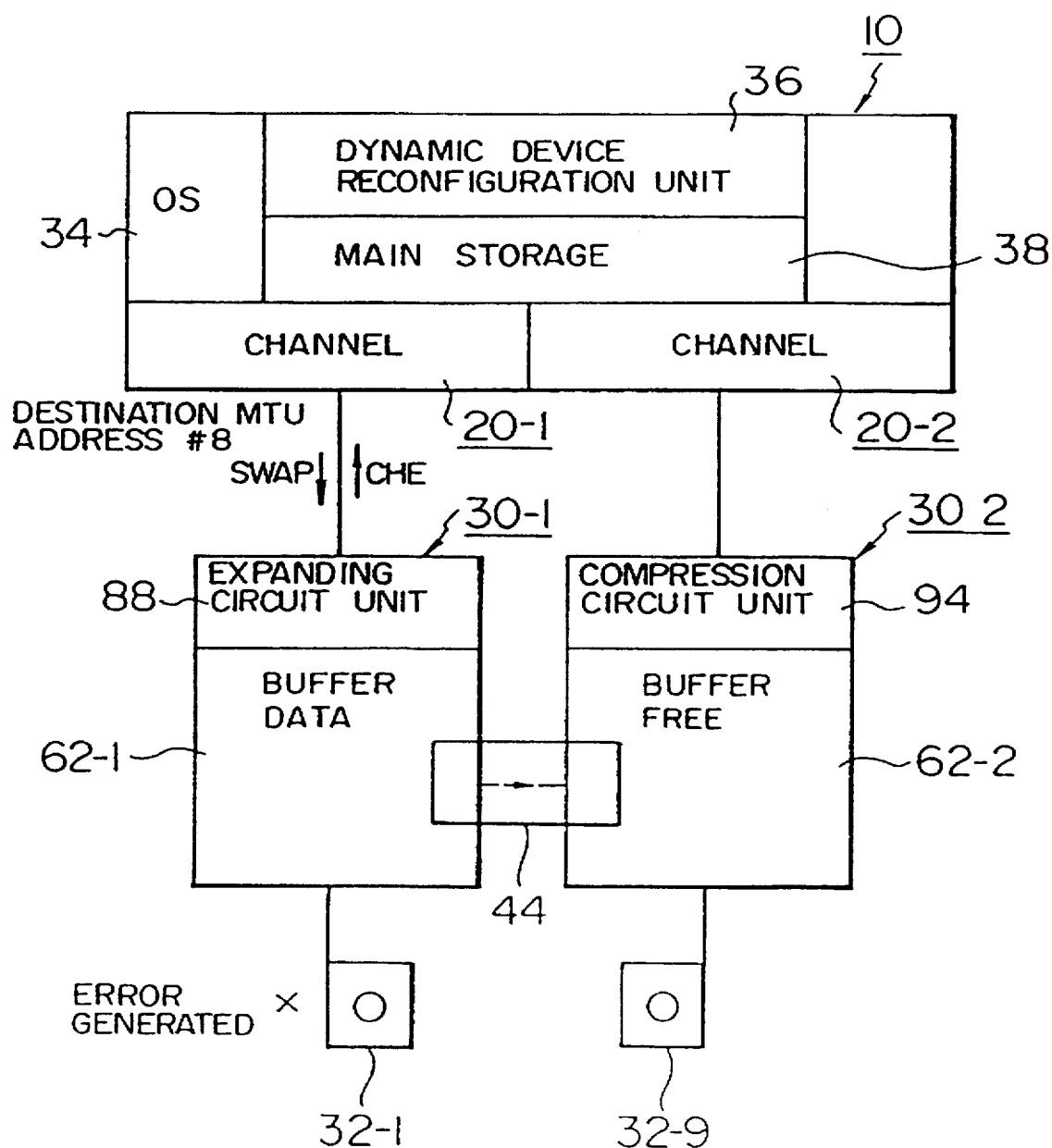
FIG. 27 is a block diagram showing the error recovering function of a fifth embodiment of the present invention.

FIG. 27 illustrates the function of the error recovery process performed in the fourth embodiment of the present invention. In this embodiment, when an error occurs, the data is transferred from the magnetic tape control unit where the error has occurred directly to the magnetic tape control unit to which the cartridge has been shifted without passing the main storage area of the host computer 10.

The dynamic device reconfiguration unit 36 implemented by the operating system 34 of the host computer 10, shown in FIG. 27, includes the save processing unit 80, the tape shift instructing unit 82 and the rewrite processing unit 84, as in the case shown in FIG. 4. Further, new commands shown in FIG. 28 are prepared in order to allow for transfer of data directly from the buffer memory of the magnetic tape control unit 30-1 in which the error has occurred to the buffer memory of the normal magnetic tape control unit 30-2.

In FIG. 28, a shift destination designating command (SWAP) is a command which designates the magnetic tape unit to which the cassette is to be shifted and which is followed by a 1-byte shift destination address, e.g., a 1-byte device ID.

A rewrite command (DWR) is a command which rewrites the data shifted to the buffer memory of the new magnetic tape control unit in the magnetic tape mounted on the new magnetic tape unit.

Figure 29:
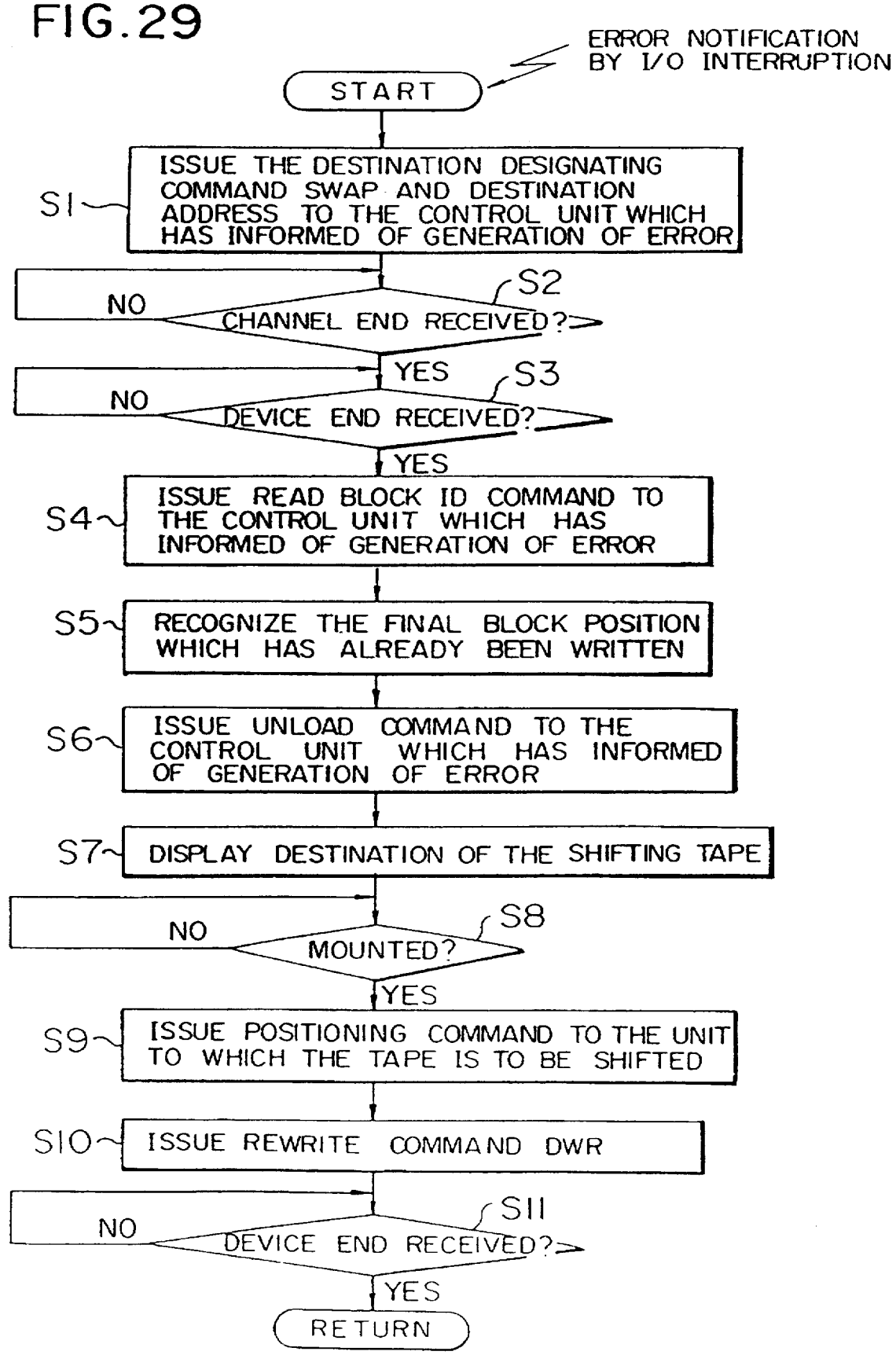
FIG. 29 is a flowchart showing the error recovery process executed in the fifth embodiment of the present invention.

FIG. 29 is a flowchart showing the error recovery process performed by the dynamic device reconfiguration unit 36 in the fifth embodiment of the present invention shown in FIG. 27. It is assumed that an error has occurred during writing in the magnetic tape unit 32-1 and that the magnetic tape control unit 30-1 has informed of the unit check to the channel unit 20-1. When the dynamic device reconfiguration unit 36 implemented by the operating system 34 receives the error information by the input/output interruption, it starts the process shown in FIG. 29. First, the dynamic device reconfiguration unit 36 issues, to the magnetic tape control unit 30-1 which has informed of generation of the error, a shift destination designating command (SWAP) and the address of the magnetic tape unit 32-9 to which the cartridge is shifted in step S1. The address to which the cartridge is shifted may be device ID #9. When the magnetic tape control unit 30-1 receives the command (SWAP), it informs of the channel end status. Thus, if it is determined that the channel end status is received from the magnetic tape control unit 30-1 in step S2, series of channel commands are ended. Thereafter, in step S3, it is determined whether the device end status is received from the magnetic tape control unit 30-1.

Upon receipt of the command (SWAP), the magnetic tape control unit 30-1 shifts the data to the magnetic tape control unit 30-2 to which the magnetic tape unit designed by the command (SWAP) is subordinate via a transfer circuit made of a common internal bus 44. When shift is completed, the magnetic tape control unit 30-1 sends the device end status. Thus, if it is determined that the device end status is received in step S3, the command (SWAP) issued in step S1 is ended.

Thereafter, the dynamic device reconfiguration unit 36 issues the read block ID command to the magnetic tape control unit 30-1 in step S4, and recognizes the final block position which has been already written in step S5. In step S6, the dynamic device reconfiguration unit 36 issues the unload command to make the magnetic tape unit 32-1 which has generated an error discharge the cartridge. Subsequently, in step S7, the dynamic device reconfiguration unit 36 displays the device ID of the magnetic tape unit 32-9 to which the cartridge is to be shifted on the operation panel and thereby make the operator or the maintenance engineer shift the cartridge.

If it is determined that the mounting of the cartridge on the magnetic tape unit 32-9 is completed in step S8, the dynamic device reconfiguration unit 36 issues the positioning command which locates the final block position which has been written in the shifted cartridge in step S9. Thereafter, the dynamic device reconfiguration unit 36 issues the rewrite command (DWR) shown in FIG. 28 in step S10 to write the data shifted to the data transfer buffer memory 62-2 of the magnetic tape control unit 30-2 in the magnetic tape unit 32-9. When the device end, indicating completion of writing, is received, the process which has been interrupted by the generation of the error is restarted.

Figure 30:
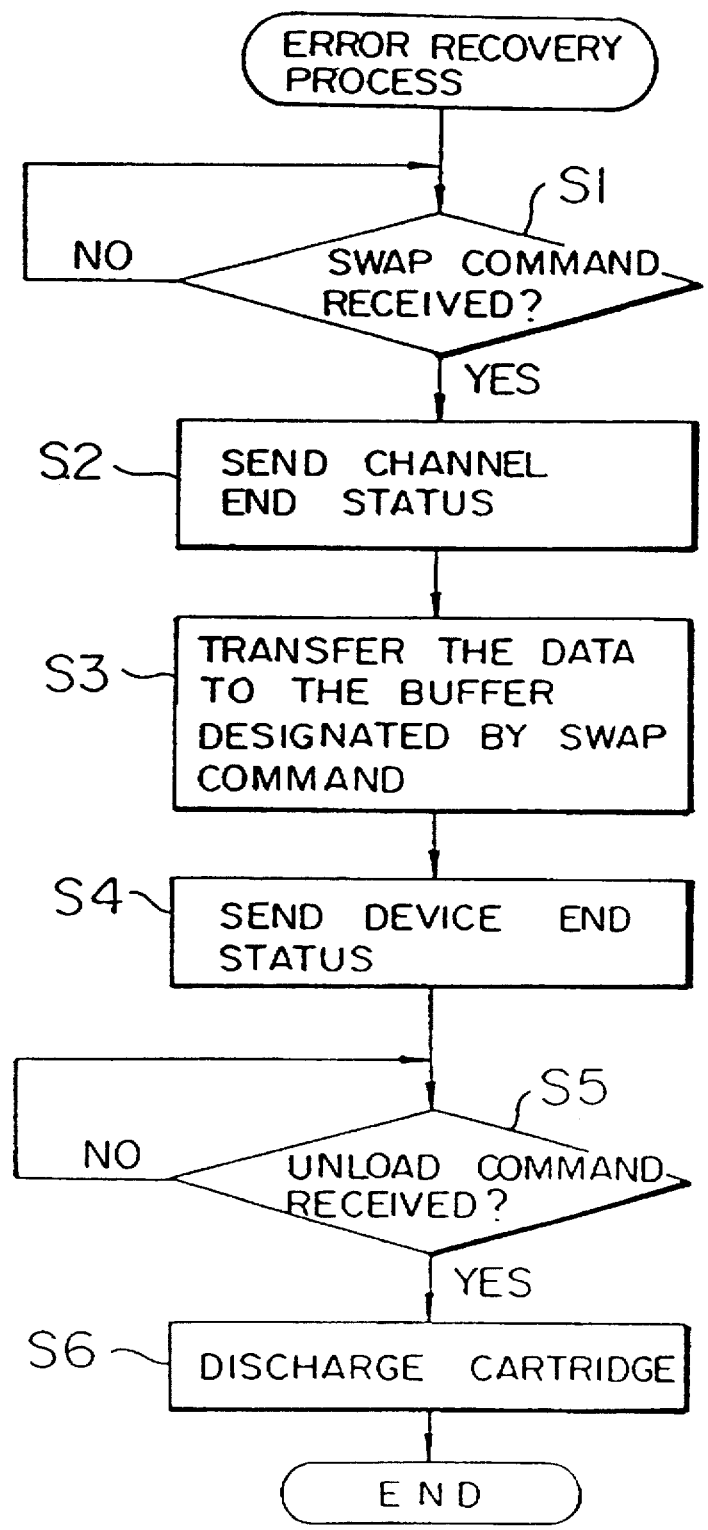
FIG. 30 is a flowchart showing the continuation of FIG. 29.

FIG. 30 is a flowchart showing the process performed by the magnetic tape control unit 30-1 which has generated the error in the fifth embodiment shown in FIG. 27. In the magnetic tape control unit 30-1, it is determined whether or not the SWAP command is received from the channel unit 20-1 in step S1. If it is determined that the command is received, the magnetic tape control unit 30-1 informs the channel end status in step S2, whereby the channel command is ended. Thereafter, in step S3, the magnetic tape control unit 30-1 transfers the data remaining on the buffer memory thereof to the buffer memory designated by the command (SWAP), and informs the device end status in step S4, whereby the command (SWAP) is ended. Thereafter, it is determined whether or not the unload command is received from the channel unit 20-1 in step S5. If the unload command is received, the magnetic tape control unit 30-1 discharges the cartridge from the magnetic tape unit 32-1 which has generated the error. Thus, in the fifth embodiment, since the main storage area 38 of the host computer 10 is not used at all when the error is generated, the error recovery process by the dynamic device reconfiguration does not restrict the main storage at all, and interruption of the other jobs or failure of the dynamic device reconfiguration can thus be completely prevented.

As will be understood from the foregoing description, even if the compressed data remains in the buffer memory as the data which has not been written, it is possible to execute the error recovery process by the dynamic device reconfiguration in which the usage of the main storage area is restricted. Thus, failure of the error recovery process due to the failure in the reservation of the save area in the main storage area or interruption of the other jobs due to the reservation of the enormous save area can be prevented, thus enhancing the reliability and system performance.

In the above-described embodiments, the subsystem contains two magnetic tape control units which are cross call connected to all the subordinate magnetic tape units. However, it is not necessary for the magnetic tape control units to be cross call connected to the subordinate magnetic tape units.

Further, the number of magnetic tape units, which are subordinate to the magnetic tape control units, can be determined appropriately.

Further, in the second embodiment, the magnetic disk unit is used in the subsystem as the unit to which the data on the buffer memory is saved when the error is generated in the magnetic tape unit. However, other direct access storage devices (DASD), such as an optical disk unit, can also be used.

What is claimed is:

1. An error recovering apparatus for subsystems which employ magnetic tape units, said apparatus comprising:

a subsystem including magnetic tape units; and a host device having a main storage area for executing input/output commands to transfer data between said host device and said subsystem by writing data to said subsystem or reading data from said magnetic tape units; said subsystem including:

a plurality of input and output control units for receiving the commands from said host device and controlling execution of the commands;

a subsystem data compressor/expander corresponding to each input and output control unit for compressing and expanding data transferred between said host and said subsystem;

a buffer memory for storing data compressed by said subsystem data compressor/expander and data read from said magnetic tape units;

said input and output control units executing a process on one of said magnetic tape units having a tape medium mounted therein by writing data transferred from said host device from said buffer memory to said one of said magnetic tape units after it has been compressed by said data compressor/expander, or by transferring data read from said one of said magnetic tape units and expanded by said data compressor/expander to said host device, after it has been stored in said buffer memory and expanded by said data compressor/expander; and error detection means for detecting any data writing errors generated by said one of said magnetic tape units while data from said host device is being written to said one of said tape units based on the commands from said host device and for informing said host device of detected errors, said host device including:

save means for reserving a save area in said main storage area and for writing data remaining in said buffer memory to said save area when an error is detected by said error detection means;

tape shift instruction means for making said one of said magnetic tape units discharge which has generated an error the tape medium when an error is detected by said error detecting means, and for designating another magnetic tape unit in said subsystem to shift the discharged tape medium into;

rewriting means for rewriting data from said save area into said another magnetic tape unit; and compression/expansion means performing data compression before data is written in said save area by said save means and for performing expansion before compressed data read from said save area is rewritten in said another magnetic tape unit by said rewriting means.

2. An apparatus according to claim 1, wherein said save means reserves, in said main storage area, a save area having a size sufficiently large to store said data remaining in said buffer memory.

3. An error recovering method for a subsystem which includes a plurality of magnetic tape control units each of which controls magnetic tape units which are subordinate thereto, said method comprising:

issuing input/output commands from a host device to said subsystem to transfer data by writing data to said subsystem or reading data from magnetic tape units in said subsystem;

compressing, in said subsystem, data written from said host device;

expanding, in said subsystem, data read from said magnetic tape units;

buffering data compressed during said step of compressing or read from said magnetic tape units into a buffer memory in said subsystem;

input and output controlling the commands issued in said issuing step and executing a process on one of said magnetic tape units having a tape medium by writing data transferred from said host device from said buffer memory to said one of said magnetic tape units after it has been compressed by said step of compressing, or by transferring data read from said one of said magnetic tape units to said host device after it has been stored in said buffer memory and expanded by said step of expanding;

detecting any data writing errors generated by said one of said magnetic tape units while data is being written to said tape medium on the basis of the commands from said host device and informing said host device of detected errors;

providing a save area in a main storage area of said host device and writing data remaining in said buffer memory in said save area when an error is detected in said error detecting step;

tape shifting by making a magnetic tape unit which has generated an error discharge the tape medium and designating another magnetic tape unit to shift the discharged tape medium into;

rewriting data written in said save area by said step of providing into said another magnetic tape unit; and compressing data, in said host device, before it is written in said save area during said providing step, and expanding, in said host device, data read from said save area during said rewriting step before the data read from said save area is written into said another magnetic tape unit.

4. A method according to claim 3, wherein said providing step comprises reserving, in said main storage area, a save area having a size sufficiently large to store said data remaining in said buffer memory.

5. An error recovering apparatus for subsystems which employ magnetic tape units, said apparatus comprising:

a plurality of subsystems including magnetic tape units; and a host device having a main storage area for executing input/output commands to transfer data between said host device and said subsystems by writing data to said subsystems or reading data from said magnetic tape units; each of said subsystems including:

a plurality of input and output control units for receiving the commands from said host device and controlling execution of the commands;

a subsystem data compressor/expander corresponding to each input and output control unit for compressing and expanding data transferred between said host unit and said subsystem;

a buffer memory for storing data compressed by said data compressor/expander and data read from said magnetic tape units;

said input and output control units executing a process on one of said magnetic tape units having a tape medium mounted therein by writing data transferred from said host device from said buffer memory to said magnetic tape unit after it has been compressed by said data compressor/expander, or by transferring data read from one of said magnetic tape units and expanded by said data compressor/expander to said host device, after it has been stored in said buffer memory and expanded by said data compressor/expander; and an error detection means for detecting data writing errors generated by said one of said magnetic tape units while data is being written to said one of said tape units based on the commands from said host device and for reforming said host device of detected errors; said host device including:

save means for reserving a save area in said main storage area, for transferring data remaining in said buffer memory to another subsystem via said save area, and for writing data therein when said host is informed of an error by said error detection means;

tape shift instruction means for making said one of said magnetic tape units which has generated the error discharge the tape medium when an error is detected by said error detection means, and for designating another magnetic tape unit in said each subsystem to shift the discharged tape medium into; and rewriting means for rewriting, via said save area of said host device, data stored in said another subsystem to said another magnetic tape unit to which the tape medium has been shifted.

6. An apparatus according to claim 5, wherein said save means reserves, in said main storage area, a save area having a size equal to the maximum block size of said data remaining in said buffer memory.

7. An apparatus according to claim 5, wherein said save means transfers said data remaining in said buffer memory to a magnetic disk apparatus provided as an external storage unit.

8. An error recovering method for a subsystem which includes a plurality of magnetic tape control units each of which controls magnetic tape units which are subordinate thereto, said method comprising:

issuing input/output commands from a host device to said subsystem to transfer data by writing data to said subsystem or reading data from magnetic tape units in said subsystem;

compressing, in said subsystem, data written from said host device to said subsystem;

expanding, in said subsystem, data read from said magnetic tape units;

buffering data compressed during said step of compressing or read from said magnetic tape units into a buffer memory in said subsystem;

input and output controlling the commands issued in said issuing step and executing a process on one of said magnetic tape units having a tape medium by writing data transferred from said host device from said buffer memory to said one of said magnetic tape units after it has been compressed by said step of compressing, or by transferring data read from said one of said magnetic tape units to said host device after it has been stored in said buffer memory and expanded by said step of expanding;

detecting any data writing errors generated by said one of said magnetic tape units while data is being written to said tape medium on the basis of the commands from said host device and for informing said host device of detected errors;

providing a save area in a main storage area of said host device and transferring data remaining in said buffer memory to another subsystem via said save area to write data therein when an error is detected in said error detecting step;

tape shifting by making said one of said magnetic tape units which has generated an error discharge the tape medium and designating another magnetic tape unit to shift the discharged tape medium into; and rewriting data transferred to said another subsystem into said another magnetic tape unit.

9. A method according to claim 8, wherein said providing step comprises reserving, in said main storage area, a save area having a size equal to the maximum block size of said data remaining in said buffer memory.

10. A method according to claim 8, wherein said providing step comprises transferring said data remaining in said buffer memory to a magnetic disk apparatus provided as an external storage unit.

11. An error recovering apparatus for subsystems which employ magnetic tape units, said apparatus comprising:

a subsystem including magnetic tape units; and a host device having a main storage area for executing input/output commands to transfer data between said host device and said subsystem by writing data to said subsystem or reading data from said magnetic tape units; said subsystem including:

a plurality of input and output control units for receiving the commands from said host device and controlling execution of the commands;

a subsystem data compressor/expander corresponding to each input and output control unit for compressing and expanding data transferred between said host and said subsystem;

a buffer memory for storing data compressed by said data compressor/expander and data read from said magnetic tape units;

said input and output control units executing a process on one of said magnetic tape units having a tape medium mounted therein by writing data transferred from said host device from said buffer memory to said one of said magnetic tape units after it has been compressed by said data expander/compressor, or by transferring data read from said one of said magnetic tape units to said host device after it has been stored in said buffer memory and expanded by said data compressor/expander; and error detection means for detecting any data writing errors generated by said one of said magnetic tape units while data from said host device is being written to said one of said magnetic tape units based on the commands from said host device and for informing said host device of detected errors; said host device including:

save means for reserving a save area in said main storage area and for transferring compressed data remaining in said buffer memory to said save area when an error is detected by said error detection means;

tape shift instruction means for making said one of said magnetic tape units discharge the tape medium when an error is detected by said error detecting means, and for designating another magnetic tape unit in said subsystem to shift the discharged tape medium into; and rewriting means for rewriting said compressed data stored in said save area to said another magnetic tape unit.

12. An apparatus according to claim 11, wherein said save means issues a read command prohibiting expansion of the compressed data remaining in said buffer memory, thereby causing direct transfer of the compressed data remaining in said buffer memory to said another buffer memory.

13. An apparatus according to claim 11, wherein said rewriting means issues a write command prohibiting compression of the data transferred to an input/output control unit having, under control thereof, said one of said magnetic tape units, thereby causing direct writing of the compressed data remaining in said buffer memory, which have been transferred from said save area, into said another magnetic tape unit.

14. An error recovering method for a subsystem which includes a plurality of magnetic tape control units each of which controls magnetic tape units which are subordinate thereto, said method comprising:

issuing input/output commands from a host device to said subsystem to transfer data by writing data to said subsystem or reading data from magnetic tape units in said subsystem;

compressing, in said subsystem, data written from said host device;

expanding, in said subsystem, data read from said magnetic tape units;

buffering data compressed during said step of compressing or read from said magnetic tape units into a buffer memory in said subsystem;

input and output controlling the commands issued in said issuing step and executing a process on one of said magnetic tape units having a tape medium by writing data transferred from said host device from said buffer memory to said one of said magnetic tape units after it has been compressed by said step of compressing, or by transferring data read from said one of said magnetic tape units to said host device after it has been stored in said buffer memory and expanded by said step of expanding;

detecting any data writing errors generated by said one of said magnetic tape units while data is being written to said tape medium on the basis of the commands from said host device and for informing said host device of detected errors;

providing a save area in a main storage area of said host device and transferring compressed data remaining in said buffer memory to said save area when an error is detected by said error detecting;

tape shifting by making said one of said magnetic tape units discharge the tape medium when an error is detected during said step of error detecting and designating another magnetic tape unit to shift the discharged tape medium into; and rewriting said compressed data stored in said save area to said another magnetic tape unit.

15. A method according to claim 14, wherein said providing step comprises issuing a read command prohibiting expansion of the compressed data remaining in said buffer memory, thereby causing direct transfer of the compressed data to said save area.

16. A method according to claim 14, wherein said rewriting step comprises issuing a write command prohibiting compression of the data transferred to an input/output control unit having, under control thereof, said one of said magnetic tape units, thereby causing direct writing of the data remaining in said buffer memory to said another magnetic tape unit.

17. An error recovering apparatus for subsystems which employ magnetic tape units, said apparatus comprising:

a subsystem including magnetic tape units; and a host device having a main storage area for executing input/output commands to transfer data between said host device and said subsystem by writing data to said subsystem or reading data from said magnetic tape units; said subsystem including:

a plurality of input and output control units for receiving the commands from said host device and controlling execution of the commands;

a subsystem data compressor/expander corresponding to each input and output control unit for compressing and expanding data transferred between said host and said subsystem;

a physical buffer memory for storing data compressed by said subsystem data compressor/expander and data read from said magnetic tape units;

said input and output control units executing a process on one of said magnetic tape units having a tape medium mounted therein by writing data transferred from said host device from physical buffer memory to said one of said magnetic tape units after it has been compressed by said data compressor/expander, or transferring data read from said one of said magnetic tape units and expanded by said subsystem data compressor/expander to said host device after it has been stored in said physical buffer memory and expanded by said subsystem data compressor/expander; and error detection means provided for each of said input and output control units for detecting any data writing errors generated by said one of said magnetic tape units while data from said host device is being written to said one of said magnetic tape units based on the commands from said host device and for informing said host device of detected errors; said host device including:

save means for reserving a save area in said main storage area and for writing data remaining in said physical buffer memory to said save area when an error is detected by said error detection means;

tape shift instruction means provided in said host device for making said one of said magnetic tape units which has generated the error discharge the tape medium when an error is detected by said error detecting means, and for designating another magnetic tape unit in said subsystem to shift the discharged tape medium into;

rewriting means for rewriting data from said save area into said another magnetic tape unit; said subsystem further comprising:

logical buffer memory control means provided in each of said input and output control units for storing data transferred from said host device as uncompressed data, corresponding to data written from said host device and stored in said physical buffer memory, in a virtual logical buffer memory included in said subsystem, and for removing the uncompressed data from said logical buffer memory as respectively corresponding compressed data is written from said physical buffer memory to said one of said nagnetic tape units; and transfer control means provided in each of said input and output control units for determining whether there is a free area in said logical buffer memory when a data transfer request is received from said host device, for permitting data transfer if there is a free area in said virtual logical buffer memory, and for inhibiting data transfer until a free area is created by said removing of uncompressed data by said logical buffer control means.

18. An apparatus according to claim 17, wherein said save means reserves a save area having a size equal to said logical buffer memory in said main storage area.

19. An error recovering method for a subsystem which includes a plurality of magnetic tape control units each of which controls magnetic tape units which are subordinate thereto, said method comprising:

issuing input/output commands to transfer data from a host device to said subsystem by writing data to said subsystem or reading data from magnetic tape units in said subsystem;

compressing, in said subsystem, data written from said host device;

expanding, in said subsystem data read from said magnetic tape units;

buffering data compressed by said step of compressing or read from said magnetic tape units into a physical buffer memory in said subsystem;

input and output controlling the commands issued in said issuing step and executing a process on one of said magnetic tape units having a tape medium by writing data transferred from said host device from said physical buffer memory to said one of said magnetic tape units after it has been compressed by said step of compressing, or by transferring data read from said one of said magnetic tape units to said host device after it has been stored in said buffer memory and expanded by said step of expanding;

detecting any data writing errors generated by said one of said magnetic tape units while data is being written from said physical buffer memory to said tape medium on the basis of the commands from said host device and for informing said host device of detected errors;

providing a save area in a main storage area of said host device and writing data remaining in said buffer memory in said save area when an error is detected by said step of error detecting;

tape shifting by making said one of said magnetic tape units discharge the tape medium when an error is detected by said step of error detecting, and designating another magnetic tape unit to shift the discharged tape medium into;

rewriting data from said save area to said another magnetic tape unit;

logical buffer memory storing data transferred from said host device in a virtual logical buffer memory in said subsystem as uncompressed data corresponding to data written from said host device and stored in said physical buffer memory, and removing the uncompressed data from said logical buffer memory as respectively corresponding compressed data is written from said physical buffer memory in said one of said magnetic tape units; and determining whether there is a free area in said logical buffer memory when a data transfer request is received from said host device, and permitting data transfer if there is a free area in said buffer memory or inhibiting data transfer until a free area is created by said removing during said step of logical memory storing.

20. A method according to claim 19, wherein said providing step comprises reserving, in said main storage area, a save area having a size equal to that of said logical buffer memory.

21. An error recovering apparatus for subsystems which employ magnetic tape units, said apparatus comprising:

a subsystem including magnetic tape units; and a host device having a main storage area for executing input/output commands to transfer data between said host device and said subsystem by writing data in said subsystem or reading data from said subsystem; said subsystem including:

a plurality of input and output control units for receiving the commands from said host device and controlling execution of the commands;

a subsystem data compressor/expander corresponding to each input and output control unit for compressing and expanding data transferred between said host and said subsystem;

a buffer memory corresponding to each of said input and output control units for storing data compressed by a corresponding subsystem data compressor/expander and data read from corresponding magnetic tape units;

one of said input and output control units executing a process on one of said magnetic tape units having a tape medium mounted therein by writing data transferred from a respectively corresponding buffer memory, to said one of said magnetic tape units after it has been compressed by said respectively corresponding data compressor/expander, or by transferring data read from said one of said magnetic tape units to said host device after it has been stored in said respectively corresponding buffer memory and expanded by said respectively corresponding subsystem data compressor/expander; and error detection means provided for each of said input and output control units for detecting any data writing errors generated by said one of said magnetic tape units while data from said host device is being written to said one of said magnetic tape units based on the commands from said host device and for informing said host device of detected errors; said host device including:

save means for transferring data remaining in said buffer memory directly to another buffer memory corresponding to another of said other input and output control units when an error is detected by said error detection means;

tape shift instruction means for making said one of said magnetic tape units which has generated an erro discharge the tape medium when an error is detected by said error detecting means and for designating another magnetic tape unit in said subsystem corresponding said another one of the plurality input and output control units to shift the discharged tape medium into; and rewriting means for rewriting data stored in said another buffer memory to said another magnetic tape unit.

22. An apparatus according to claim 21, wherein said plurality of input/output control units connected to said host device are provided with a common internal bus.

23. An error recovering method for a subsystem which includes a plurality of magnetic tape control units each of which controls magnetic tape units which are subordinate thereto, said method comprising:

issuing input/output commands from a host device to transfer data to said subsystem by writing data to said subsystem or reading data from magnetic tape units in said subsystem;

compressing, in said subsystem data written from said host device;

expanding, in said subsystem, data read from said magnetic tape units;

buffering data compressed by said step of compressing or read from said magnetic tape units into a buffer memory in said subsystem;

input and output controlling the commands issued in said issuing step and executing a process on one of said magnetic tape units having a tape medium by writing data transferred from said host device from said buffer memory to said one of said magnetic tape units after it has been compressed by said step of compressing, or by transferring data read from said one of said magnetic tape units to said host device after it has been stored in said buffer memory and expanded by said step of expanding;

detecting any errors generated by said one of said magnetic tape units while data is being written to said tape medium on the basis of the commands from said host device and for informing said host device of detected errors;

transferring data remaining in said buffer memory directly to another buffer memory when an error is detected by said step of error detecting;

tape shifting by making said one of said magnetic tape units which has generated an error discharge the tape medium when an error is detected by said error detecting step, and designating another magnetic tape unit corresponding to said another buffer memory to shift the discharged tape medium into; and rewriting data stored in said another buffer memory to said another magnetic tape unit.

24. A method according to claim 23, wherein said step of transferring comprises transferring the data remaining in said buffer memory through a common internal bus directly connecting at least two of said input/output control units.

* * * * *

UNITED STATES PATENT AND TRADEMARK OFFICE
CERTIFICATE OF CORRECTION

PATENT NO. : 5,546,533
DATED : August 13, 1996
INVENTOR(S) : Koyama

It is certified that error appears in the above-indentified patent and that said Letters Patent is hereby corrected as shown below:

On the Title Page:

Under "[56] References Cited, U.S. Patent Documents", delete "O'Baenet" and insert --O'Brien--.

On the title page, item [54] and column 1, line 4, after "magnetic", insert --tape--.

Column 2, line 5, delete "(0$)" and insert --(OS)--

Column 2, line 7, delete "301" and insert --30-1--

Column 10, line 35, after "computer 10", insert --.--

Column 10, line 38, delete "an compression" and insert --a compression--

Column 16, line 54, delete "rserved" and insert --reserved--

UNITED STATES PATENT AND TRADEMARK OFFICE
CERTIFICATE OF CORRECTION

PATENT NO. : 5,546,533
DATED : August 13, 1996
INVENTOR(S) : Koyama

It is certified that error appears in the above-indentified patent and that said Letters Patent is hereby corrected as shown below:

Column 19, line 35, delete "discharge"

Column 19, line 36, before "the tape medium", insert --discharge--

Column 21, line 2, delete "reforming" and insert --informing--

Column 24, line 13, before "transferring data", insert --by--

Column 24, line 48, delete "nagnetic tape" and insert --magnetic tape--

Column 25, line 5, after "subsystem", insert --,--

Column 26, line 35, delete "erro" and insert --error-- (From Claim 9,

UNITED STATES PATENT AND TRADEMARK OFFICE
CERTIFICATE OF CORRECTION

PATENT NO. : 5,546,533
DATED : August 13, 1996
INVENTOR(S) : Koyama

It is certified that error appears in the above-indentified patent and that said Letters Patent is hereby corrected as shown below:

Column 26, line 35, delete "erro" and insert --error--

Signed and Sealed this

Eighth Day of July, 1997

Attest:

Attesting Officer

BRUCE LEHMAN

Commissioner of Patents and Trademarks